(12) United States Patent
Dustin et al.

(10) Patent No.: US 11,999,817 B1
(45) Date of Patent: Jun. 4, 2024

(54) BISMALEIMIDE-THIOL-EPOXY POLYMER COMPOSITIONS, AND METHODS OF MAKING AND USING THE SAME

(71) Applicant: HRL Laboratories, LLC, Malibu, CA (US)

(72) Inventors: Ashley Dustin, Los Angeles, CA (US); Adam Gross, Santa Monica, CA (US); Andrew Nowak, Los Angeles, CA (US); Kaitlin Albanese, Santa Barbara, CA (US)

(73) Assignee: HRL Laboratories, LLC, Malibu, CA (US)

( * ) Notice: Subject to any disclaimer, the term of this patent is extended or adjusted under 35 U.S.C. 154(b) by 135 days.

(21) Appl. No.: 17/345,475

(22) Filed: Jun. 11, 2021

Related U.S. Application Data

(60) Provisional application No. 63/142,685, filed on Jan. 28, 2021, provisional application No. 63/083,166, filed on Sep. 25, 2020.

(51) Int. Cl.
*C08G 59/38* (2006.01)
*C08G 59/40* (2006.01)
(Continued)

(52) U.S. Cl.
CPC ......... *C08G 59/38* (2013.01); *C08G 59/4014* (2013.01); *C08G 59/5006* (2013.01); *C08J 5/042* (2013.01); *C08J 2363/00* (2013.01)

(58) Field of Classification Search
None
See application file for complete search history.

(56) References Cited

U.S. PATENT DOCUMENTS 5,494,986 A * 2/1996 Corley ................... C08G 73/12
526/338
5,725,948 A * 3/1998 Oka ........................ H01L 24/32
428/458

(Continued)

FOREIGN PATENT DOCUMENTS

WO   2009145779 A1   12/2009
WO   WO-2009145779 A1 * 12/2009 ............. C08G 73/12

OTHER PUBLICATIONS

Vita et al., "Comparative life cycle assessment and cost analysis of autoclave and pressure bag molding for producing CFRP components", The International Journal of Advanced Manufacturing Technology (2019) 105:1967-1982.

(Continued)

*Primary Examiner* — Megan McCulley
(74) *Attorney, Agent, or Firm* — O'Connor & Company; Ryan P. O'Connor

(57) ABSTRACT

Some variations provide a thermoformable and thermosettable bismaleimide-thiol-epoxy resin composition comprising: a thiol-endcapped bismaleimide monomer or oligomer; a thiol-containing species; an epoxy species; a curing catalyst; and optional additives. Other variations provide a method of making a bismaleimide-thiol-epoxy resin composition, comprising: providing a starting bismaleimide, a starting multifunctional amine, a starting multifunctional thiol, an acid catalyst, and a solvent to form a starting reaction mixture; reacting the bismaleimide, the multifunctional amine, and the multifunctional thiol to form a thiol-endcapped bismaleimide monomer or oligomer; providing a thiol-containing species; providing at least one epoxy species; providing a curing catalyst; and combining the thiol-endcapped bismaleimide monomer or oligomer, the thiol-containing species, the epoxy species, and the curing catalyst, to form a bismaleimide-thiol-epoxy resin compo- (Continued)

sition. Other variations provide a method of thermoprocessing comprising: thermoforming, but not completely curing, a bismaleimide-thiol-epoxy resin composition; and, at a later time, completely curing the thermoformed bismaleimide-thiol-epoxy resin.

32 Claims, 15 Drawing Sheets

(51) Int. Cl.
*C08G 59/50* (2006.01)
*C08J 5/04* (2006.01)

(56) References Cited

U.S. PATENT DOCUMENTS

| | | | | |
|---|---|---|---|---|
| 5,866,250 | A | * | 2/1999 | Oka ........................ H01L 24/32 |
| | | | | 428/355 R |
| 7,390,570 | B2 | * | 6/2008 | Choi ..................... C08L 19/006 |
| | | | | 428/297.4 |
| 2004/0072933 | A1 | * | 4/2004 | Shustack ............. C09J 179/085 |
| | | | | 524/280 |
| 2004/0260038 | A1 | * | 12/2004 | Choi ...................... C08G 18/38 |
| | | | | 525/533 |
| 2018/0237668 | A1 | * | 8/2018 | Mizori ................... C09J 163/00 |

OTHER PUBLICATIONS

Shibata et al., "High performance thermosetting bismaleimide resins via thiolmaleimide 'click' reaction", European Polymer Journal, vol. 93, Aug. 2017, pp. 561-571.

* cited by examiner

BISMALEIMIDE-THIOL-EPOXY POLYMER COMPOSITIONS, AND METHODS OF MAKING AND USING THE SAME

PRIORITY DATA

This patent application is a non-provisional application claiming priority to U.S. Provisional Patent App. No. 63/083,166, filed on Sep. 25, 2020, and to U.S. Provisional Patent App. No. 63/142,685, filed on Jan. 28, 2021, each of which is hereby incorporated by reference herein.

FIELD OF THE INVENTION

The present invention generally relates to bismaleimide polymer compositions, and methods of making and using bismaleimide polymer compositions.

BACKGROUND OF THE INVENTION

Epoxy-based resins, such as epoxy-amine resins, have many diverse applications including adhesives, structural composites, coatings, and high-performance thermosets. Current state-of-the-art epoxy-amine thermoset composites require high polymerization enthalpies and long cure times (about 10 hours or more).

Typical epoxy-amine thermosets do not behave like thermoplastic polymers as they cannot be easily reshaped or reformed once crosslinking has been initiated. A low-viscosity epoxy-based resin that is thermoformable but with thermoset stability would be a desirable attribute for aerospace and automotive applications, among other. These contradictory properties have the potential to reduce production costs, ease formation of complex geometries, and introduce additional manufacturing methods such as resin-transfer molding to further expedite production.

There is generally a desire for low-temperature, out-of-autoclave processing such as resin-transfer molding. The ability to manufacture composites utilizing resin-transfer molding reduces costs by about 30% compared to typical autoclave systems as well as enabling shorter cure cycles. See Vita, *The International Journal of Advanced Manufacturing Technology* volume 105, pages 1967-1982 (2019), which is hereby incorporated by reference.

Maleimide is a chemical compound with the formula $H_2C_2(CO)_2NH$. This unsaturated imide is an important building block in organic synthesis. The name is a contraction of maleic acid and imide, the —C(O)NHC(O)— functional group. Maleimides also are a class of derivatives of the parent maleimide in which the NH group is replaced with alkyl or aryl groups, such as a methyl or phenyl, respectively.

Bismaleimides are a class of compounds with two maleimide groups connected by their nitrogen atoms via a linking group, which is typically aliphatic or aromatic. Bismaleimides are used as crosslinking reagents in thermoset polymer chemistry. Bismaleimides have glass-transition temperatures in excess of 260° C. and continuous-use temperatures of 200-230° C. Bismaleimides have applications in high-performance structural composites and adhesives for aircraft, as well as aerospace applications in which temperatures beyond 150-180° C. are commonly experienced.

Shibata et al., "High performance thermosetting bismaleimide resins via the thiol-maleimide "click" reaction", *European Polymer Journal*, 2017, 93, 561-571, which is hereby incorporated by reference, disclose a strategy for preparing a thiol-maleimide thermosetting resin under a nucleophile-mediated thiol-Michael addition reaction. This approach uses thiol-maleimide click reactions for thermosetting bismaleimide resins.

Musa et al., WO 2009/145779 A1, published Dec. 3, 2009, which is hereby incorporated by reference, describe synthesis of oligomers end-capped with bismaleimide functionality and extended with difunctional amine or thiol motifs. The thermoset network is composed of chain-extended bismaleimide from a diamine and/or dithiol and a curing initiator for microelectronic applications. The resin composition is cured through polymerization with free-radical curing of monomers or through Michael addition mechanisms in the presence of co-monomers.

Shustack et al., US 2004/0072933 A1, published Apr. 15, 2004, which is hereby incorporated by reference, disclose compositions containing multifunctional thiols synthesized from a bismaleimide to be used as adhesion promoters or primers.

There are numerous literature examples pertaining to thiol-maleimide oligomers for crosslinked thermosets. However, these materials lack molecular rigidity and thermal stability. A common problem that has plagued thiol-epoxy structural materials is the rotational flexibility of the thio-ether linkage (—$CH_2$—S—$CH_2$—), leading to a low glass-transition temperature in the resulting material. Most commercially available thiol monomers are aliphatic and contain ester functionality, which further diminish the thermomechanical integrity of the polymer backbone.

What is needed is an epoxy-based resin that behaves like a thermoplastic (thermoformable) while exhibiting properties of a thermoset. Such an epoxy-based resin can reduce production costs and increase manufacturing rates. What is particularly desired is a bismaleimide-thiol-epoxy resin composition that is both thermoformable and thermosettable.

SUMMARY OF THE INVENTION

The present invention addresses the aforementioned needs in the art, as will now be summarized and then further described in detail below.

Some variations provide a bismaleimide-thiol-epoxy resin composition comprising:
 (a) at least one thiol-endcapped bismaleimide monomer or oligomer;
 (b) at least one thiol-containing species having a thiol functionality of at least 2;
 (c) at least one epoxy species having an epoxide functionality of at least 2;
 (d) optionally, at least one curing catalyst (which is typically present, but not necessarily present until curing is desired); and
 (e) optionally, at least one additive,
 wherein the bismaleimide-thiol-epoxy resin composition is thermosettable.

In some embodiments, at least one thiol-endcapped bismaleimide monomer or oligomer is an oligomer with a degree of oligomerization selected from 2 to 10. In some embodiments, at least one thiol-endcapped bismaleimide monomer or oligomer is a monomer.

In some embodiments, at least one thiol-endcapped bismaleimide monomer or oligomer is an acid-catalyzed reaction product of (i) a bismaleimide, (ii) a multifunctional amine, and (iii) a multifunctional thiol. That acid catalyst that catalyzes the reaction to make the reaction product may be an organic acid, such as acetic acid. The multifunctional amine may contain one or more aromatic groups.

In some bismaleimide-thiol-epoxy resin compositions, the thiol functionality is at least 3.

In some embodiments, at least one thiol-containing species is aromatic or aliphatic. In certain embodiments, at least one thiol-containing species is selected from the group consisting of 1,2-bis(2-mercaptoethoxy)ethane, hexanedithiol, 1,2,4-tris(2-mercaptoethyl)cyclohexane, pentaerythritol tetrakis(3-mercaptopropionate), 4,4'-thiobisbenzenethiol, 1,4-benzenediethanethiol, and combinations thereof.

In some bismaleimide-thiol-epoxy resin compositions, the epoxide functionality is at least 3.

In some embodiments, at least one epoxy species is aromatic or aliphatic. In certain embodiments, at least one epoxy species is selected from the group consisting of N,N,N',N'-tetraglycidyl-4,4'-methylenebisbenzenamine, bisphenol A diglycidyl ether, and combinations thereof.

A curing catalyst may be added to the bismaleimide-thiol-epoxy resin composition during synthesis. Alternatively, or additionally, a curing catalyst may be added at a later time, such as just prior to or during curing of the bismaleimide-thiol-epoxy resin composition.

Amine-based catalysts, and especially tertiary-amine catalysts, are especially useful as curing catalysts. In certain embodiments, at least one curing catalyst is selected from the group consisting of 1-methylimidazole, triethylamine, 1,8-diazabicyclo[5.4.0]undec-7-ene, 1,5-diazabicyclo[4.3.0]non-5-ene, and combinations thereof.

In some embodiments, at least one additive is selected from the group consisting of a viscosity modifier, an adhesion promoter, a liquid toughener, a particulate toughener, an antioxidant, a thermal enhancer, a flame retardant, a surfactant, and combinations thereof.

A viscosity modifier may be selected from the group consisting of silica, fumed silica, polyether ether ketone, polyetherketoneketone, carbon black, alumina, glycolic acid ethoxylates, methyltrialkylammonium chloride, oleylamine, polyoxypropylene-polyoxyethylene poloxamers, polyoxyethylene isooctylcyclohexyl ether, polyethylene glycol tert-octylphenyl ether, polyethylene glycol nonylphenyl ether, 3-(1-pyridinio)-1-propanesulfonate, dimethylethylammoniumpropane sulfonate, sodium 2,3-dimercaptopropanesulfonate monohydrate, and combinations thereof, for example. Other high-surface-area inorganic materials may be utilized as a viscosity modifier.

An adhesion promoter may be selected from the group consisting of titanates, zirconates, silanes, and combinations thereof, for example.

A particulate toughener may be selected from the group consisting of polyether ether ketone, polyetherketoneketone, acrylonitrile-butadiene-styrene terpolymers, polyaramides, polyimides, and combinations thereof, for example.

An antioxidant may be selected from the group consisting of metal oxides (e.g., iron oxides), organic radical scavengers (e.g., hindered amines), inorganic radical scavengers, and combinations thereof, for example.

A thermal enhancer may be selected from the group consisting of metal oxides, metal carbonates, metal nitrides, metal silicates, metal silicides, and combinations thereof, for example. Thermal enhancers may be spherical, plate-like, or needle-like, for example. In certain embodiments, a thermal enhancer is selected from the group consisting of silica, alumina, titania, mica, $CaSiO_3$, iron oxides, and combinations thereof.

A flame retardant may be selected from the group consisting of ammonium salts, phosphate salts, phosphines, halogenated compounds, carbonate salts, hydroxide salts, borate salts, silica, and combinations thereof, for example. For instance, high-surface-area silicas inhibit flame propagation. In certain embodiments, a flame retardant is selected from the group consisting of ammonium polyphosphate, magnesium hydroxide, zinc hydroxystannate, antimony trioxide, magnesium hydroxycarbonate, zinc borate, magnesium aluminum hydroxycarbonate, aluminum trihydroxide, tetrabromobisphenol A, tetrabromobisphenol A-bis (2,3-dibromopropyl ether), bisphenol-A-bis(diphenyl phosphate), brominated polyols, melamine resins, chlorinated paraffins, and combinations thereof.

Surfactants, when present, may be selected to modify the wetting properties of the resin and improve processing and/or substrate compatibility. Surfactants may be anionic, cationic, nonionic, or zwitterionic. In certain embodiments, a surfactant is selected from the group consisting of glycolic acid ethoxylates, methyltrialkylammonium chloride, oleylamine, polyoxypropylene-polyoxyethylene poloxamers, polyoxyethylene isooctylcyclohexyl ether, polyethylene glycol tert-octylphenyl ether, polyethylene glycol nonylphenyl ether, 3-(1-pyridinio)-1-propanesulfonate, dimethylethylammoniumpropane sulfonate, sodium 2,3-dimercaptopropanesulfonate monohydrate, and combinations thereof. Certain exemplary surfactants include glycolic acid ethoxylate lauryl ether, Adogen® 464, Triton® X-100 reduced, Triton® X-114 reduced-reduced, Triton® X-405 reduced-reduced, and Triton® N-101 reduced.

The bismaleimide-thiol-epoxy resin composition is preferably thermoformable. In some embodiments, the bismaleimide-thiol-epoxy resin composition is characterized by a curing time of from about 0.5 hours to about 8 hours at a curing temperature of 180° C.

The present invention, in some variations, provides a partially cured variant of a disclosed bismaleimide-thiol-epoxy resin composition. The present invention, in some variations, provides a completely cured variant of the bismaleimide-thiol-epoxy resin composition. Some variations thus provide a partially or completely cured bismaleimide-thiol-epoxy resin composition comprising:
(a) at least one thiol-endcapped bismaleimide monomer or oligomer, or a reacted form thereof,
(b) at least one thiol-containing species having a thiol functionality of at least 2, or a reacted form thereof;
(c) at least one epoxy species having an epoxide functionality of at least 2, or a reacted form thereof,
(d) at least one curing catalyst; and
(e) optionally, at least one additive,
wherein the bismaleimide-thiol-epoxy resin composition is at least partially thermosetted (cured).

Some variations provide a carbon fiber-reinforced composite comprising (i) a bismaleimide-thiol-epoxy resin composition as disclosed and (ii) one or more continuous carbon fiber tows.

Other variations of the invention provide a method of making a bismaleimide-thiol-epoxy resin composition, the method comprising:
(i) providing a starting bismaleimide, a starting multifunctional amine, a starting multifunctional thiol, an acid catalyst, and optionally a solvent to form a starting reaction mixture;
(ii) reacting the starting bismaleimide, the starting multifunctional amine, and the starting multifunctional thiol to form at least one thiol-endcapped bismaleimide monomer or oligomer;
(iii) providing at least one thiol-containing species having a thiol functionality of at least 2;
(iv) providing at least one epoxy species having an epoxide functionality of at least 2;

(v) providing at least one curing catalyst;
(vi) optionally, providing at least one additive; and
(vii) combining the at least one thiol-endcapped bismaleimide monomer or oligomer, the at least one thiol-containing species, the at least one epoxy species, the at least one curing catalyst, and (if step (vi) is conducted) the at least one additive, to form a bismaleimide-thiol-epoxy resin composition.

In some methods, the starting bismaleimide is selected from the group consisting of 4,4'-bis(maleimido)diphenylmethane, N,N'-(1,3-phenylene)dimaleimide, and combinations thereof.

The starting multifunctional amine is preferably aromatic. In some embodiments, the starting multifunctional amine is selected from the group consisting of 4,4'-diaminodiphenylmethane, 4,4'-diaminodiphenyl sulfone, phenyldiamine, 4,4'-(difluoromethylene)bisbenzenamine, bis(4-aminophenyl)methanone, and combinations thereof.

The starting multifunctional thiol is preferably aromatic or aliphatic. In some embodiments, the starting multifunctional thiol is selected from the group consisting of 1,2-bis(2-mercaptoethoxy)ethane, hexanedithiol, 1,2,4-tris(2-mercaptoethyl)cyclohexane, pentaerythritol tetrakis(3-mercaptopropionate), 4,4'-thiobisbenzenethiol, 1,4-benzenediethanethiol, and combinations thereof.

The acid catalyst in step (i) may be acetic acid, for example. Many other acid catalysts, including organic or inorganic catalysts, may be employed.

In some methods, the thiol functionality of the thiol-containing species in step (iii) is at least 3. In some methods, at least one thiol-containing species is aromatic or aliphatic. In certain embodiments, at least one thiol-containing species is selected from the group consisting of 1,2-bis(2-mercaptoethoxy)ethane, hexanedithiol, 1,2,4-tris(2-mercaptoethyl)cyclohexane, pentaerythritol tetrakis(3-mercaptopropionate), 4,4'-thiobisbenzenethiol, 1,4-benzenediethanethiol, and combinations thereof.

In some methods, the epoxide functionality of at least one epoxy species in step (iv) is at least 3. In some methods, at least one epoxy species is aromatic or aliphatic. In certain embodiments, at least one epoxy species is selected from the group consisting of N,N,N',N'-tetraglycidyl-4,4'-methylenebisbenzenamine, bisphenol A diglycidyl ether, and combinations thereof.

Amine-based catalysts, and especially tertiary-amine catalysts, are especially useful as curing catalysts in step (v). In certain embodiments, at least one curing catalyst is selected from the group consisting of 1-methylimidazole, triethylamine, 1,8-diazabicyclo[5.4.0]undec-7-ene, 1,5-diazabicyclo[4.3.0]non-5-ene, and combinations thereof.

In some methods, at least one additive is selected from the group consisting of a viscosity modifier, an adhesion promoter, a liquid toughener, a particulate toughener, an antioxidant, a thermal enhancer, a flame retardant, a surfactant, and combinations thereof. Multiple additives may be incorporated, such as two, three, four, or more additives.

A viscosity modifier may be selected from the group consisting of silica, fumed silica, polyether ether ketone, polyetherketoneketone, carbon black, alumina, glycolic acid ethoxylates, methyltrialkylammonium chloride, oleylamine, polyoxypropylene-polyoxyethylene poloxamers, polyoxyethylene isooctylcyclohexyl ether, polyethylene glycol tert-octylphenyl ether, polyethylene glycol nonylphenyl ether, 3-(1-pyridinio)-1-propanesulfonate, dimethylethylammoniumpropane sulfonate, sodium 2,3-dimercaptopropanesulfonate monohydrate, and combinations thereof, for example. Other high-surface-area inorganic materials may be utilized as a viscosity modifier.

An adhesion promoter may be selected from the group consisting of titanates, zirconates, silanes, and combinations thereof, for example.

A particulate toughener may be selected from the group consisting of polyether ether ketone, polyetherketoneketone, acrylonitrile-butadiene-styrene terpolymers, polyaramides, polyimides, and combinations thereof, for example.

An antioxidant may be selected from the group consisting of metal oxides (e.g., iron oxides), organic radical scavengers, inorganic radical scavengers, and combinations thereof, for example.

A thermal enhancer may be selected from the group consisting of metal oxides, metal carbonates, metal nitrides, metal silicates, metal silicides, and combinations thereof, for example. In certain embodiments, a thermal enhancer is selected from the group consisting of silica, alumina, titania, mica, $CaSiO_3$, iron oxides, and combinations thereof. Thermal enhancers may be spherical, plate-like, or needle-like, for example.

A flame retardant may be selected from the group consisting of ammonium salts, phosphate salts, phosphines, halogenated compounds, carbonate salts, hydroxide salts, borate salts, silica, and combinations thereof, for example. For instance, high-surface-area silicas inhibit flame propagation. In certain embodiments, a flame retardant is selected from the group consisting of ammonium polyphosphate, magnesium hydroxide, zinc hydroxystannate, antimony trioxide, magnesium hydroxycarbonate, zinc borate, magnesium aluminum hydroxycarbonate, aluminum trihydroxide, tetrabromobisphenol A, tetrabromobisphenol A-bis (2,3-dibromopropyl ether), bisphenol-A-bis(diphenyl phosphate), brominated polyols, melamine resins, chlorinated paraffins, and combinations thereof.

Surfactants, when present, may be selected to modify the wetting properties of the resin and improve processing and/or substrate compatibility. Surfactants may be anionic, cationic, nonionic, or zwitterionic. In certain embodiments, a surfactant is selected from the group consisting of glycolic acid ethoxylates, methyltrialkylammonium chloride, oleylamine, polyoxypropylene-polyoxyethylene poloxamers, polyoxyethylene isooctylcyclohexyl ether, polyethylene glycol tert-octylphenyl ether, polyethylene glycol nonylphenyl ether, 3-(1-pyridinio)-1-propanesulfonate, dimethylethylammoniumpropane sulfonate, sodium 2,3-dimercaptopropanesulfonate monohydrate, and combinations thereof.

In some embodiments, the method further comprises partially or completely curing the bismaleimide-thiol-epoxy resin composition. For example, the bismaleimide-thiol-epoxy resin composition may be partially cured while thermoforming and then, at a later time, completely cured.

Some variations provide a partially or completely cured bismaleimide-thiol-epoxy resin composition produced by a process comprising a method disclosed herein.

Other variations of the invention provide a method of thermoprocessing a bismaleimide-thiol-epoxy resin composition, the method comprising:
(i) providing a bismaleimide-thiol-epoxy resin composition comprising:
at least one thiol-endcapped bismaleimide monomer or oligomer;
at least one thiol-containing species having a thiol functionality of at least 2;
at least one epoxy species having an epoxide functionality of at least 2;
at least one curing catalyst; and optionally, at least one additive;

(ii) thermoforming, but not completely curing, the bismaleimide-thiol-epoxy resin composition, to generate a thermoformed bismaleimide-thiol-epoxy resin; and (iii) separately from step (ii), completely curing the thermoformed bismaleimide-thiol-epoxy resin.

In step (ii), a curing catalyst may or may not be present. In step (iii), a curing catalyst is necessary or at least strongly preferred for faster reaction kinetics.

In step (ii), the degree of curing (i.e., molar conversion of curing reaction) may vary, such as from about 0% to about 50%, e.g. about, at least about, or at most about 1%, 5%, 10%, 20%, 30%, 40%, or 50%.

In some embodiments, the thermoforming in step (ii) is B-staging of the bismaleimide-thiol-epoxy resin composition. For example, B-staging may comprise exposing the bismaleimide-thiol-epoxy resin composition to a temperature from about 25° C. to about 100° C. for a time from about 5 minutes to about 2 weeks. As another example, B-staging may comprise exposing the bismaleimide-thiol-epoxy resin composition to a temperature from about 10° C. to about 30° C. for a time from about 1 hour to about 24 hours. A specific example is exposing the bismaleimide-thiol-epoxy resin composition to a temperature of about 25° C. for 15 hours.

In some embodiments, thermoforming in step (ii) comprises exposing the bismaleimide-thiol-epoxy resin composition to a temperature from about 25° C. to about 100° C., such as from about 40° C. to about 80° C., or from about 65° C. to about 75° C.

In some embodiments, complete curing in step (iii) is conducted in about 8 hours or less, such as about 2 hours or less. In these or other embodiments, complete curing in step (iii) is conducted at a temperature of about 200° C. or less, such as about 180° C. or less, or about 160° C. or less.

Steps (ii) and (iii) may be conducted at the same location or at different locations. Different locations may refer to different manufacturing sites. Alternatively, or additionally, different locations may refer to different parts or steps of a mold process. For example, step (ii) may be conducted within a mold while step (iii) may be conducted outside of that mold.

In some embodiments, the thermoformed bismaleimide-thiol-epoxy resin is transferred to another substrate, surface, container, mold, or device prior to step (iii).

Some variations provide a cured bismaleimide-thiol-epoxy resin composition produced by a process comprising the disclosed method.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF EMBODIMENTS OF THE INVENTION

Figure 1:
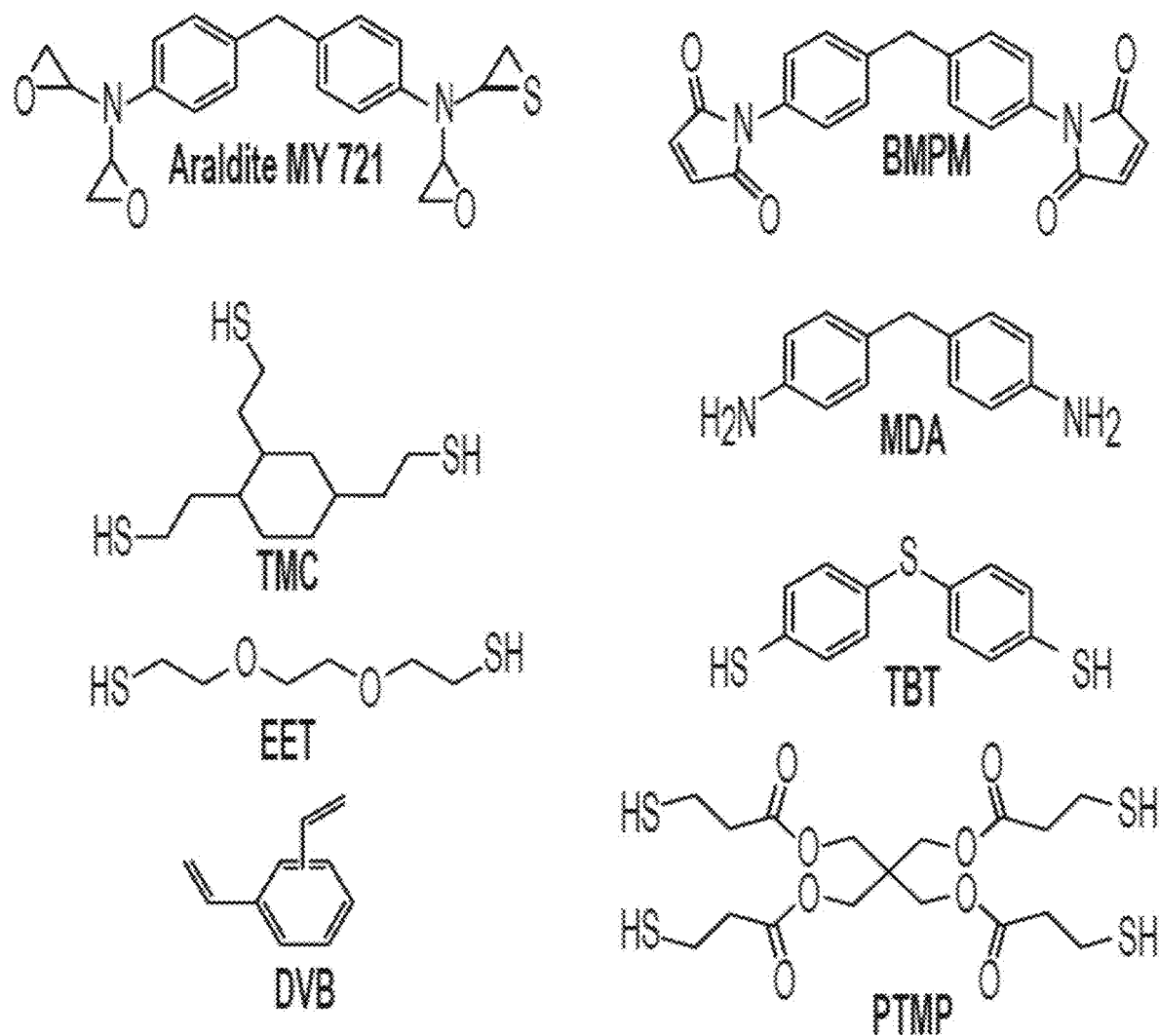
FIG. 1 depicts chemical structures of materials referenced in Examples 1A to 3 herein.

The principles, materials, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

The present disclosure is predicated on the discovery of bismaleimide-containing thiol-epoxy resin compositions with thermoplastic processing capabilities until triggered by an external stimuli (e.g., heat) to form a crosslinked network. Some variations generally provide a thermoformable and thermosettable polymer resin comprising a functionalized bismaleimide, a chain crosslinker (e.g., a thiol), a curing agent (e.g., an epoxy), and a curing catalyst (e.g., a tertiary amine catalyst). Some embodiments provide a thermoformable and thermosettable polymer resin comprising a thiol-endcapped bismaleimide monomer or oligomer, a multifunctional thiol, an epoxy, and a curing catalyst.

Optionally, the resin composition includes one or more additives that improve a selected property. The selected property may be processability, handleability, flammability, rheology, corrodibility (propensity to corrode), thermal stability, or thermooxidative stability, for example. The composition may contain a material to raise the maximum use temperature as well as a flame retardant, for instance.

As noted in the Background, thiol-epoxy resins tend to have poor thermomechanical properties due to rotational flexibility of the thioether linkage (—CH$_2$—S—CH$_2$—). The present inventors have overcome this limitation by incorporating molecular rigidity utilizing a thiol-endcapped bismaleimide combined with a multifunctional epoxy and a multifunctional thiol in the crosslinkable resin. The curable resin composition includes a robust thiol monomer or oligomer (e.g., a thiol-endcapped bismaleimide), a multifunctional thiol (e.g., 1,2,4-tris(2-mercaptoethyl)cyclohexane), epoxy (e.g., N,N,N',N'-tetraglycidyl-4,4'-methylenebisbenzenamine), and preferably a catalyst (e.g., 1-methylimidazole). The thiol-endcapped bismaleimide monomer or oligomer may be prepared via a Michael addition reaction of aromatic diamines and bismaleimides followed by an in situ thiol-maleimide click coupling reaction. The use of a bismaleimide adduct imparts structural stability due to the rigid aromatic character.

Traditional epoxy-amine thermoset polymers require long cure times (typically about 10 hours or more) and cannot be reshaped or reformed once a cure is initiated. By contrast, in some embodiments of this disclosure, by improving the thiol-epoxy chemistry, a low-viscosity resin has been fabricated with reduced cure times, resin-transfer molding (RTM) capabilities, and broad low-temperature thermoformability. Preferred formulations contain a thiol-endcapped bismaleimide monomer or oligomer, a multifunctional epoxy, a multifunctional thiol species, and optionally one or more additives contributing to a structural resin capable of meeting rate and performance needs in many applications of commercial interest.

In particular, in some embodiments, the disclosed bismaleimide-containing thiol-epoxy resin is advantageous for low-temperature, out-of-autoclave processing such as resin-transfer molding. The ability to manufacture composites utilizing resin-transfer molding enables lower costs and shorter cure cycles. Contrary to typical epoxy-amine thermosets that do not behave like thermoplastic polymers, preferred thermoformable thiol-epoxy resins as disclosed herein allow reshaping of a partially crosslinked material until taken to a complete cure.

In some embodiments, a tunable thiol-epoxy thermoset resin allows for accelerated cure times, such as at least 10× faster than commercial-off-the-shelf aerospace-grade epoxy resins, while maintaining an adequate pot life. A structural resin with 10× faster curing provides new manufacturing opportunities and methods for high-performance thermoset materials. For example, certain thiol-epoxy resins disclosed herein enable a complete cure in under 2 hours.

Conventional limitations have been overcome by incorporating molecular rigidity using a thiol-endcapped bismaleimide along with multifunctional epoxy and thiol reagents. Incorporating commercial-off-the-shelf or custom additives broadens the application space to include a variety of environmental conditions, processing needs, and performance requirements.

Some variations provide a bismaleimide-thiol-epoxy resin composition comprising:
  (a) at least one thiol-endcapped bismaleimide monomer or oligomer;
  (b) at least one thiol-containing species having a thiol functionality of at least 2;
  (c) at least one epoxy species having an epoxide functionality of at least 2;
  (d) optionally, at least one curing catalyst (which is typically present, but not necessarily present until curing is desired); and
  (e) optionally, at least one additive,
  wherein the bismaleimide-thiol-epoxy resin composition is thermosettable.

In some embodiments, at least one thiol-endcapped bismaleimide monomer or oligomer is an oligomer with a degree of oligomerization selected from 2 to 10, such as 2, 3, 4, 5, 6, 7, 8, 9, or 10. In some embodiments, at least one thiol-endcapped bismaleimide monomer or oligomer is a monomer. There may be a range of repeat units present; for example there may be monomers as well as oligomers with different chain lengths all present.

In some embodiments, at least one thiol-endcapped bismaleimide monomer or oligomer is an acid-catalyzed reaction product of (i) a bismaleimide, (ii) a multifunctional amine, and (iii) a multifunctional thiol. That acid catalyst that catalyzes the reaction to make the reaction product may be an organic acid, such as acetic acid. The multifunctional amine (to make the acid-catalyzed reaction product) may contain one or more aromatic groups. For example, the multifunctional amine may be selected from the group consisting of 4,4'-diaminodiphenylmethane, 4,4'-diaminodiphenyl sulfone, phenyldiamine, 4,4'-(difluoromethylene)bisbenzenamine, bis(4-aminophenyl)methanone, and combinations thereof. The multifunctional thiol (to make the acid-catalyzed reaction product) is preferably aromatic or aliphatic. For example, the multifunctional thiol may be selected from the group consisting of 1,2-bis(2-mercaptoethoxy)ethane, hexanedithiol, 1,2,4-tris(2-mercaptoethyl) cyclohexane, pentaerythritol tetrakis(3-mercaptopropionate), 4,4'-thiobisbenzenethiol, 1,4-benzenediethanethiol, and combinations thereof.

In some bismaleimide-thiol-epoxy resin compositions, the thiol functionality is at least 3, such as 3, 4, or 5. In some bismaleimide-thiol-epoxy resin compositions, at least one thiol-containing species is aromatic or aliphatic. In certain embodiments, at least one thiol-containing species is selected from the group consisting of 1,2-bis(2-mercaptoethoxy)ethane, hexanedithiol, 1,2,4-tris(2-mercaptoethyl) cyclohexane, pentaerythritol tetrakis(3-mercaptopropionate), 4,4'-thiobisbenzenethiol, 1,4-benzenediethanethiol, and combinations thereof. In certain embodiments, the thiol-containing species contains no ester linkages, no ether linkages, or no ester or ether linkages in the molecular structure.

In some bismaleimide-thiol-epoxy resin compositions, the epoxide functionality is at least 3, such as 3, 4, or 5. In some bismaleimide-thiol-epoxy resin compositions, at least one epoxy species is aromatic or aliphatic. In certain embodiments, at least one epoxy species is selected from the group consisting of N,N,N',N'-tetraglycidyl-4,4'-methylenebisbenzenamine, bisphenol A diglycidyl ether, and combinations thereof.

A curing catalyst may be added to the bismaleimide-thiol-epoxy resin composition during synthesis. Alternatively, or additionally, a curing catalyst may be added at a later time, such as just prior to or during curing of the bismaleimide-thiol-epoxy resin composition.

The curing catalyst is preferably a base (rather than an acid). Amine-based catalysts, and especially tertiary-amine catalysts, are especially useful as curing catalysts. In certain embodiments, at least one curing catalyst is selected from the group consisting of 1-methylimidazole, triethylamine, 1,8-diazabicyclo[5.4.0]undec-7-ene, 1,5-diazabicyclo[4.3.0]non-5-ene, and combinations thereof. Base-catalyzed thiol-epoxy mechanisms are different than acid-catalyzed mechanisms. It will be recognized that some amount of uncatalyzed curing may occur. In certain embodiments, a separate curing catalyst may not be necessary, such as when an additive imparts sufficient catalytic activity or when slow and/or lower-selectivity reaction kinetics are acceptable.

In some embodiments, at least one additive is selected from the group consisting of a viscosity modifier, an adhesion promoter, a liquid toughener, a particulate toughener, an antioxidant, a thermal enhancer, a flame retardant, a surfactant, and combinations thereof.

A viscosity modifier may be selected from the group consisting of silica, fumed silica, polyether ether ketone, polyetherketoneketone, carbon black, alumina, glycolic acid ethoxylates, methyltrialkylammonium chloride, oleylamine, polyoxypropylene-polyoxyethylene poloxamers, polyoxyethylene isooctylcyclohexyl ether, polyethylene glycol tert-octylphenyl ether, polyethylene glycol nonylphenyl ether, 3-(1-pyridinio)-1-propanesulfonate, dimethylethylammoniumpropane sulfonate, sodium 2,3-dimercaptopropanesulfonate monohydrate, and combinations thereof, for example. Other high-surface-area inorganic materials may be utilized as a viscosity modifier. In some embodiments, the viscosity modifier is a surfactant as well.

An adhesion promoter may be selected from the group consisting of titanates, zirconates, silanes, and combinations thereof, for example.

A particulate toughener may be selected from the group consisting of polyether ether ketone, polyetherketoneketone, acrylonitrile-butadiene-styrene terpolymers, polyaramides, polyimides, and combinations thereof, for example.

An antioxidant may be selected from the group consisting of metal oxides (e.g., iron oxides), organic radical scavengers, inorganic radical scavengers, and combinations thereof, for example.

Thermal enhancers may be additives may be selected to raise the maximum use temperature. Additives that increase maximum use temperature preferably do not soften at temperatures for which the cured polymer softens. A thermal enhancer may be selected from the group consisting of metal oxides, metal carbonates, metal nitrides, metal silicates, metal silicides, and combinations thereof, for example. In certain embodiments, a thermal enhancer is selected from the group consisting of silica, alumina, titania, mica, $CaSiO_3$, iron oxides, and combinations thereof.

A thermal enhancer may be spherical, plate-like, or needle-like, for example. A thermal enhancer may be characterized by an average particle size (e.g., diameter, effective diameter, or length) from about 0.1 microns to about 1000 microns, such as from about 1 micron to about 500 microns, for example. In various embodiments, a thermal enhancer has an average particle size of about, at least about, or at most about 0.1, 0.5, 1, 2, 3, 4, 5, 10, 15, 20, 25, 50, 75, 100, 150, 200, 250, 300, 400, 500, 600, 700, 800, 900, or 1000 microns. Particle sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd. (Worcestershire, UK). Image analysis to estimate particle sizes and distributions can be done directly on photomicrographs, scanning electron micrographs, or other images. Finally, sieving is a conventional technique of separating particles by size.

A flame retardant may be selected from the group consisting of ammonium salts, phosphate salts, phosphines, halogenated compounds, carbonate salts, hydroxide salts, borate salts, silica, and combinations thereof, for example. For instance, high-surface-area silicas inhibit flame propagation. In certain embodiments, a flame retardant is selected from the group consisting of ammonium polyphosphate, magnesium hydroxide, zinc hydroxystannate, antimony trioxide, magnesium hydroxycarbonate, zinc borate, magnesium aluminum hydroxycarbonate, aluminum trihydroxide, tetrabromobisphenol A, tetrabromobisphenol A-bis (2,3-dibromopropyl ether), bisphenol-A-bis(diphenyl phosphate), brominated polyols, melamine resins, chlorinated paraffins, and combinations thereof.

Surfactants, when present, may be selected to modify the wetting properties of the resin and improve processing and/or substrate compatibility. Surfactants may be anionic, cationic, nonionic, or zwitterionic. In certain embodiments, a surfactant is selected from the group consisting of glycolic acid ethoxylates, methyltrialkylammonium chloride, oleylamine, polyoxypropylene-polyoxyethylene poloxamers, polyoxyethylene isooctylcyclohexyl ether, polyethylene glycol tert-octylphenyl ether, polyethylene glycol nonylphenyl ether, 3-(1-pyridinio)-1-propanesulfonate, dimethylethylammoniumpropane sulfonate, sodium 2,3-dimercaptopropanesulfonate monohydrate, and combinations thereof. Certain exemplary surfactants include glycolic acid ethoxylate lauryl ether, Adogen® 464, Triton® X-100 reduced, Triton® X-114 reduced-reduced, Triton® X-405 reduced-reduced, and Triton® N-101 reduced.

The bismaleimide-thiol-epoxy resin composition is preferably thermoformable. By "thermoformable" it is meant that the bismaleimide-thiol-epoxy resin composition is capable of being reversibly shaped at an elevated temperature (above 25° C.) without complete thermosetting. Conventionally, thermoplastic materials are known to be thermoformable, while thermoset materials are not thermoformable because elevated temperatures cause irreversible curing.

Thermoformable materials may be reheated and remolded, which is very beneficial from a practical perspective. In some embodiments, the thermoformable material disclosed herein is characterized in that it does not completely cure at a temperature of about 80° C. at a hold time of about 30 minutes, for example. In some embodiments, the thermoformable material disclosed herein is characterized in that it does not completely cure at a temperature of about 60° C. at a hold time of about 100 minutes, for example.

In some embodiments, the thermoformable material has an optimized viscosity range (or other optimized mechanical properties) at a selected thermoprocessing temperature. This can be important because a viscosity that is too low (liquid-like) can make it impossible to work the material into a desired shape at reasonable temperatures, while a viscosity that is too high can make it impractical to work the material into a desired shape. In some embodiments, the thermoformable material is partially cured to increase its viscosity into a desired range for convenient mechanical processing. Such a partially cured material may be referred to as a structural resin (e.g., see FIG. 7E) because it is able to retain some structure.

In some embodiments, the thermoformable material disclosed herein is characterized in that at a thermoprocessing temperature of about 80° C., the thermoformable material has a viscosity from about 0.05 Pa·s to about $10^7$ Pa·s, for example.

In some embodiments, a thermoformable material may be subjected to "B staging" which means that the thermoformable material is held at a selected temperature, or multiple temperatures, for selected time(s) such that the thermoformable material may partially cure but does not completely cure. A B-staged material may undergo an increase in viscosity or other mechanical properties, as noted above. In various embodiments, B staging is associated with a molar conversion of the curing (thermosetting) reaction of about, at least about, or at most about 0, 1%, 2%, 5%, 10%, 15%, 20%, 25%, 30%, 35%, 40%, 45%, or 50%, including all intervening ranges.

In some embodiments, there is B staging with little or no curing, followed by thermoprocessing which itself is associated with potentially some curing but not complete curing. After the desired thermoprocessing, the material may then be completely cured. An epoxy-based resin that behaves like a thermoplastic while exhibiting ultimate properties of a thermoset is a desirable attribute for many commercial applications by reducing production costs and increasing manufacturing rates.

The bismaleimide-thiol-epoxy resin composition preferably has a fast curing time, despite being thermoprocessable. That is, at an elevated curing temperature, the curing reactions preferably occur relatively quickly, such as about 4 hours or less, and more preferably about 2 hours or less. In various embodiments, the bismaleimide-thiol-epoxy resin composition is characterized by a curing time of from about 0.5 hours to about 8 hours at a curing temperature of 180° C. In some embodiments, the bismaleimide-thiol-epoxy resin composition is characterized by a curing time of less than 2 hours at a curing temperature of 175° C. Note that the curing temperature is not necessarily higher than a previous thermoprocessing temperature.

The present invention, in some variations, provides a partially cured variant of a disclosed bismaleimide-thiol-epoxy resin composition. The present invention, in some variations, provides a completely cured variant of the bismaleimide-thiol-epoxy resin composition. Some variations thus provide a partially or completely cured bismaleimide-thiol-epoxy resin composition comprising:
  (a) at least one thiol-endcapped bismaleimide monomer or oligomer, or a reacted form thereof;
  (b) at least one thiol-containing species having a thiol functionality of at least 2, or a reacted form thereof;
  (c) at least one epoxy species having an epoxide functionality of at least 2, or a reacted form thereof;
  (d) at least one curing catalyst; and
  (e) optionally, at least one additive,
  wherein the bismaleimide-thiol-epoxy resin composition is at least partially thermosetted (cured).

Some variations provide a carbon fiber-reinforced composite comprising (i) a bismaleimide-thiol-epoxy resin composition as disclosed and (ii) one or more continuous carbon fiber tows. Carbon fiber tows are high-strength carbon fiber ribbons used in weaving fabric, filament winding, and reinforcement in high-strength, low-weight structures. Carbon fiber tows may be employed to strengthen parts with directional patterns, for example.

Other variations of the invention provide a method of making a bismaleimide-thiol-epoxy resin composition, the method comprising:
  (i) providing a starting bismaleimide, a starting multifunctional amine, a starting multifunctional thiol, an acid catalyst, and optionally a solvent to form a starting reaction mixture;
  (ii) reacting the starting bismaleimide, the starting multifunctional amine, and the starting multifunctional thiol to form at least one thiol-endcapped bismaleimide monomer or oligomer;
  (iii) providing at least one thiol-containing species having a thiol functionality of at least 2;
  (iv) providing at least one epoxy species having an epoxide functionality of at least 2;
  (v) providing at least one curing catalyst;
  (vi) optionally, providing at least one additive; and
  (vii) combining the at least one thiol-endcapped bismaleimide monomer or oligomer, the at least one thiol-containing species, the at least one epoxy species, the at least one curing catalyst, and (if step (vi) is conducted) the at least one additive, to form a bismaleimide-thiol-epoxy resin composition.

In some methods, the starting bismaleimide is selected from the group consisting of 4,4'-bis(maleimido)diphenylmethane, N,N'-(1,3-phenylene)dimaleimide, and combinations thereof.

Maleimide and its derivatives may be prepared from maleic anhydride by treatment with amines followed by dehydration. Maleimides are reactive to additions across the double bond either by Michael additions or via Diels-Alder reactions, for example. Monomer bismaleimides may be synthesized from maleic anhydride and an aromatic diamine. In the present invention, a starting bismaleimide (e.g., 4,4'-bis(maleimido)diphenylmethane) may be synthesized using known chemistry or may be purchased from a commercial supplier, for example.

The starting multifunctional amine is preferably aromatic. In some embodiments, the starting multifunctional amine is selected from the group consisting of 4,4'-diaminodiphenylmethane, 4,4'-diaminodiphenyl sulfone, phenyldiamine, 4,4'-(difluoromethylene)bisbenzenamine, bis(4-aminophenyl)methanone, and combinations thereof.

The starting multifunctional thiol is preferably aromatic or aliphatic. In some embodiments, the starting multifunctional thiol is selected from the group consisting of 1,2-bis(2-mercaptoethoxy)ethane, hexanedithiol, 1,2,4-tris(2-mercaptoethyl)cyclohexane, pentaerythritol tetrakis(3-mercaptopropionate), 4,4'-thiobisbenzenethiol, 1,4-benzenediethanethiol, and combinations thereof.

The acid catalyst in step (i) may be acetic acid, for example. Many other acid catalysts, including organic or inorganic catalysts, may be employed.

In some methods, the thiol functionality of the thiol-containing species in step (iii) is at least 3. In some methods, at least one thiol-containing species is aromatic or aliphatic. In certain embodiments, at least one thiol-containing species is selected from the group consisting of 1,2-bis(2-mercaptoethoxy)ethane, hexanedithiol, 1,2,4-tris(2-mercaptoethyl)cyclohexane, pentaerythritol tetrakis(3-mercaptopropionate), 4,4'-thiobisbenzenethiol, 1,4-benzenediethanethiol, and combinations thereof.

In some methods, the epoxide functionality of at least one epoxy species in step (iv) is at least 3. In some methods, at least one epoxy species is aromatic or aliphatic. In certain embodiments, at least one epoxy species is selected from the group consisting of N,N,N',N'-tetraglycidyl-4,4'-methylenebisbenzenamine, bisphenol A diglycidyl ether, and combinations thereof.

Amine-based catalysts, and especially tertiary-amine catalysts, are especially useful as curing catalysts in step (v). In certain embodiments, at least one curing catalyst is selected from the group consisting of 1-methylimidazole, triethylamine, 1,8-diazabicyclo[5.4.0]undec-7-ene, 1,5-diazabicyclo[4.3.0]non-5-ene, and combinations thereof. The concentration of curing catalyst may vary, such as from about 0.001 wt % to about 10 wt %, more preferably from about 0.1 wt % to about 1 wt %, for example, based on total weight of reaction mixture.

In some methods, at least one additive is selected from the group consisting of a viscosity modifier, an adhesion promoter, a liquid toughener, a particulate toughener, an antioxidant, a thermal enhancer, a flame retardant, a surfactant, and combinations thereof.

A viscosity modifier may be selected from the group consisting of silica, fumed silica, polyether ether ketone, polyetherketoneketone, carbon black, alumina, glycolic acid ethoxylates, methyltrialkylammonium chloride, oleylamine, polyoxypropylene-polyoxyethylene poloxamers, polyoxyethylene isooctylcyclohexyl ether, polyethylene glycol tert-octylphenyl ether, polyethylene glycol nonylphenyl ether, 3-(1-pyridinio)-1-propanesulfonate, dimethylethylammoniumpropane sulfonate, sodium 2,3-dimercaptopropanesulfonate monohydrate, and combinations thereof, for example. Other high-surface-area inorganic materials may be utilized as a viscosity modifier.

An adhesion promoter may be selected from the group consisting of titanates, zirconates, silanes, and combinations thereof, for example.

A particulate toughener may be selected from the group consisting of polyether ether ketone, polyetherketoneketone, acrylonitrile-butadiene-styrene terpolymers, polyaramides, polyimides, and combinations thereof, for example.

An antioxidant may be selected from the group consisting of metal oxides (e.g., iron oxides), organic radical scavengers, inorganic radical scavengers, and combinations thereof, for example.

A thermal enhancer may be selected from the group consisting of metal oxides, metal carbonates, metal nitrides, metal silicates, metal silicides, and combinations thereof, for example. Thermal enhancers may be spherical, plate-like, or needle-like, for example. In certain embodiments, a thermal enhancer is selected from the group consisting of silica, alumina, titania, mica, $CaSiO_3$, iron oxides, and combinations thereof.

A flame retardant may be selected from the group consisting of ammonium salts, phosphate salts, phosphines, halogenated compounds, carbonate salts, hydroxide salts, borate salts, silica, and combinations thereof, for example. For instance, high-surface-area silicas inhibit flame propagation. In certain embodiments, a flame retardant is selected from the group consisting of ammonium polyphosphate, magnesium hydroxide, zinc hydroxystannate, antimony trioxide, magnesium hydroxycarbonate, zinc borate, magnesium aluminum hydroxycarbonate, aluminum trihydroxide, tetrabromobisphenol A, tetrabromobisphenol A-bis (2,3-dibromopropyl ether), bisphenol-A-bis(diphenyl phosphate), brominated polyols, melamine resins, chlorinated paraffins, and combinations thereof.

Surfactants, when present, may be selected to modify the wetting properties of the resin and improve processing and/or substrate compatibility. Surfactants may be anionic, cationic, nonionic, or zwitterionic. In certain embodiments, a surfactant is selected from the group consisting of glycolic acid ethoxylates, methyltrialkylammonium chloride, oleylamine, polyoxypropylene-polyoxyethylene poloxamers, polyoxyethylene isooctylcyclohexyl ether, polyethylene glycol tert-octylphenyl ether, polyethylene glycol nonylphenyl ether, 3-(1-pyridinio)-1-propanesulfonate, dimethylethylammoniumpropane sulfonate, sodium 2,3-dimercaptopropanesulfonate monohydrate, and combinations thereof.

In some embodiments, the method further comprises partially or completely curing the bismaleimide-thiol-epoxy resin composition.

Some variations provide a partially or completely cured bismaleimide-thiol-epoxy resin composition produced by a process comprising a method disclosed herein.

Other variations of the invention provide a method of thermoprocessing a bismaleimide-thiol-epoxy resin composition, the method comprising:

(i) providing a bismaleimide-thiol-epoxy resin composition comprising:
  at least one thiol-endcapped bismaleimide monomer or oligomer;
  at least one thiol-containing species having a thiol functionality of at least 2;
  at least one epoxy species having an epoxide functionality of at least 2;
  at least one curing catalyst; and
  optionally, at least one additive;
(ii) thermoforming, but not completely curing, the bismaleimide-thiol-epoxy resin composition, to generate a thermoformed bismaleimide-thiol-epoxy resin; and
(iii) separately from step (ii), completely curing the thermoformed bismaleimide-thiol-epoxy resin.

In step (ii), a curing catalyst may or may not be present. In step (iii), a curing catalyst is necessary so that the curing reaction kinetics are reasonably fast and selective.

In step (ii), the degree of curing (i.e., molar conversion of curing reaction) may vary, such as from about 0% to about 50%, e.g. about, at least about, or at most about 1%, 5%, 10%, 15%, 20%, 25%, 30%, 40%, 45%, or 50%. The maximum degree of curing that still allows thermoforming may be determined experimentally.

In some embodiments, the thermoforming in step (ii) is B-staging of the bismaleimide-thiol-epoxy resin composition. For example, B-staging may comprise exposing the bismaleimide-thiol-epoxy resin composition to a temperature from about 25° C. to about 100° C. for a time from about 5 minutes to about 2 weeks. As another example, B-staging may comprise exposing the bismaleimide-thiol-epoxy resin composition to a temperature from about 10° C. to about 30° C. for a time from about 1 hour to about 24 hours. A specific example is exposing the bismaleimide-thiol-epoxy resin composition to a temperature of about 25° C. for 15 hours.

In some embodiments, thermoforming in step (ii) comprises exposing the bismaleimide-thiol-epoxy resin composition to a temperature from about 25° C. to about 100° C., such as from about 40° C. to about 80° C., or from about 65° C. to about 75° C.

In some embodiments, complete curing in step (iii) is conducted in about 8 hours or less, such as about 2 hours or less. In these or other embodiments, complete curing in step (iii) is conducted at a temperature of about 200° C. or less, such as about 180° C. or less, or about 160° C. or less.

Steps (ii) and (iii) may be conducted at the same location or at different locations. Different locations may refer to different manufacturing sites. Alternatively, or additionally, different locations may refer to different parts of a mold process.

In some embodiments, the thermoformed bismaleimide-thiol-epoxy resin is transferred to another substrate, surface, container, mold, or device prior to step (iii).

Some variations provide a cured bismaleimide-thiol-epoxy resin composition produced by a process comprising the disclosed method.

A carbon fiber-reinforced composite comprising (i) a bismaleimide-thiol-epoxy resin composition as disclosed and (ii) one or more continuous carbon fiber tows may be cured directly. In other embodiments, the composite is thermoprocessed prior to curing, similar to embodiments in which the bismaleimide-thiol-epoxy resin composition is thermoprocessed prior to complete curing.

Some variations thus provide a method of thermoprocessing a carbon fiber-reinforced composite, the method comprising:
(i) providing a bismaleimide-thiol-epoxy resin composition comprising:
  at least one thiol-endcapped bismaleimide monomer or oligomer;
  at least one thiol-containing species having a thiol functionality of at least 2;
  at least one epoxy species having an epoxide functionality of at least 2;
  at least one curing catalyst; and
  optionally, at least one additive;
(ii) providing continuous carbon fiber tows;
(iii) combining the bismaleimide-thiol-epoxy resin composition and the continuous carbon fiber tows to form a composite;
(iv) thermoforming, but not completely curing, the composite, to generate a thermoformed composite; and
(v) separately from step (iv), completely curing the thermoformed composite.

EXAMPLES

Materials.

4,4'-bis(maleimido)diphenylmethane (BMPM), 4,4'-diaminodiphenylmethane (MDA), 1,2-bis(2-mercaptoethoxy)ethane (EET), N,N-dimethylformamide (DMF), 4,4'-thiobisbenzenethiol (TBT), pentaerythritol tetrakis(3-mercaptopropionate) (PTMP), divinylbenzene (DVB) and 1-methylimidazole (1-MeIm) are purchased from Sigma-Aldrich and used as received. 1,2,4-tris(2-mercaptoethyl)cyclohexane (TMC) is prepared by Richmond Chemicals. N,N,N',N'-tetraglycidyl-4,4'-methylenebisbenzenamine (Araldite® MY721) is supplied by Huntsman Advanced Materials. FIG. 1 depicts chemical structures of materials referenced in Examples 1A to 3.

Example 1a: Thiol Oligomer Synthesis of Oligo($BmI_2$-$MDA_1$)$EET_{10}$

In a three-neck round-bottom flask, BMI (3.58 g, 10.0 mmol) and MDA (0.99 g, 5.0 mmol) are dissolved in NMP (10 mL) and acetic acid (0.5 mL) under Ar (in all cases in these Examples, Ar is $Ar_{(g)}$). The reaction proceeds under reflux at 130° C. for 4 h. After allowing to cool to room temperature (about 25° C.), EET (9.12 g, 50.0 mmol) is added and left to stir for 2 h. The product is precipitated in water and isolated via vacuum filtration to yield oligo($BMI_2$-$MDA_1$)$EET_{10}$ as a red liquid. Note that $EET_{10}$ refers to 10 mole equivalents of EET in the formulation.

Example 1B: Thiol Oligomer Synthesis of Oligo($BmI_2$-$MDA_1$)$EET_4$

In a three-neck round-bottom flask, BMI (3.58 g, 10.0 mmol) and MDA (0.99 g, 5.0 mmol) are dissolved in NMP (10 mL) and acetic acid (0.5 mL) under Ar. The reaction proceeds under reflux at 130° C. for 4 h. After allowing to cool to room temperature, EET (3.65 g, 20.00 mmol) is added and left to stir for 2 h. The product is precipitated in water and isolated via vacuum filtration to yield oligo($BMI_2$-$MDA_1$)$EET_4$.

Example 1C: Thiol Oligomer Synthesis of Oligo($BmI_1$-$EET_5$)

In a three-neck round-bottom flask, BMI (3.58 g, 10.0 mmol) and EET (9.12 g, 50.0 mmol) are dissolved in NMP (10 mL) and acetic acid (0.5 mL) under Ar. The reaction proceeds at room temperature for 2 h. The resulting oligomer is precipitated in water and isolated via vacuum filtration to yield oligo($BMI_1$-$EET_5$).

Example 1D: Thiol Oligomer Synthesis of Oligo($BmI_2$-$MDA_1$)$TBT_3$

In a three-neck round-bottom flask, BMI (3.58 g, 10.0 mmol) and MDA (0.99 g, 5.0 mmol) are dissolved in NMP (10 mL) and acetic acid (0.5 mL) under Ar. The reaction proceeds under reflux at 130° C. for 4 h. After allowing the mixture to cool to room temperature, TBT (3.76 g, 15.0 mmol) is added and left to stir for 2 h. The resulting oligomer is precipitated in water and isolated via vacuum filtration to yield oligo($BMI_2$-$MDA_1$)$TBT_3$.

Example 1E: Thiol Oligomer Synthesis of Oligo(PTMP-DVB)

PTMP (7.51 g, 15.36 mmol), DVB (1.00 g, 7.68 mmol), and benzoyl peroxide (0.05 g, 5 phr) as a thermal initiator are added to a round-bottom flask. The flask is sealed with a rubber septum and purged with Ar for 10 min. The reaction mixture is heated to 90° C. for 4 h to yield oligo(PTMP-DVB) as a clear viscous liquid. The resulting oligomer is stored under Ar at 0° C.

Example 2A: Thiol-Epoxy Rapid-Cure Resin

Thiol oligomer (Example 1A) (0.5 g, 0.18 mmol), TMC (2.90 g, 10.9 mmol), and Araldite MY721 (3.70 g, 8.2 mmol) are combined in a FlackTek cup and speedmixed at 2000 rpm for 1 min. Once combined, 1-MeIm (2 mol %) is added and speedmixed at 2000 rpm for 1 min. The resin mixture is B-staged at 50° C. for 2 h and 10 min with overhead stirring. The resulting resin is stored at −18° C.

Figure 2:
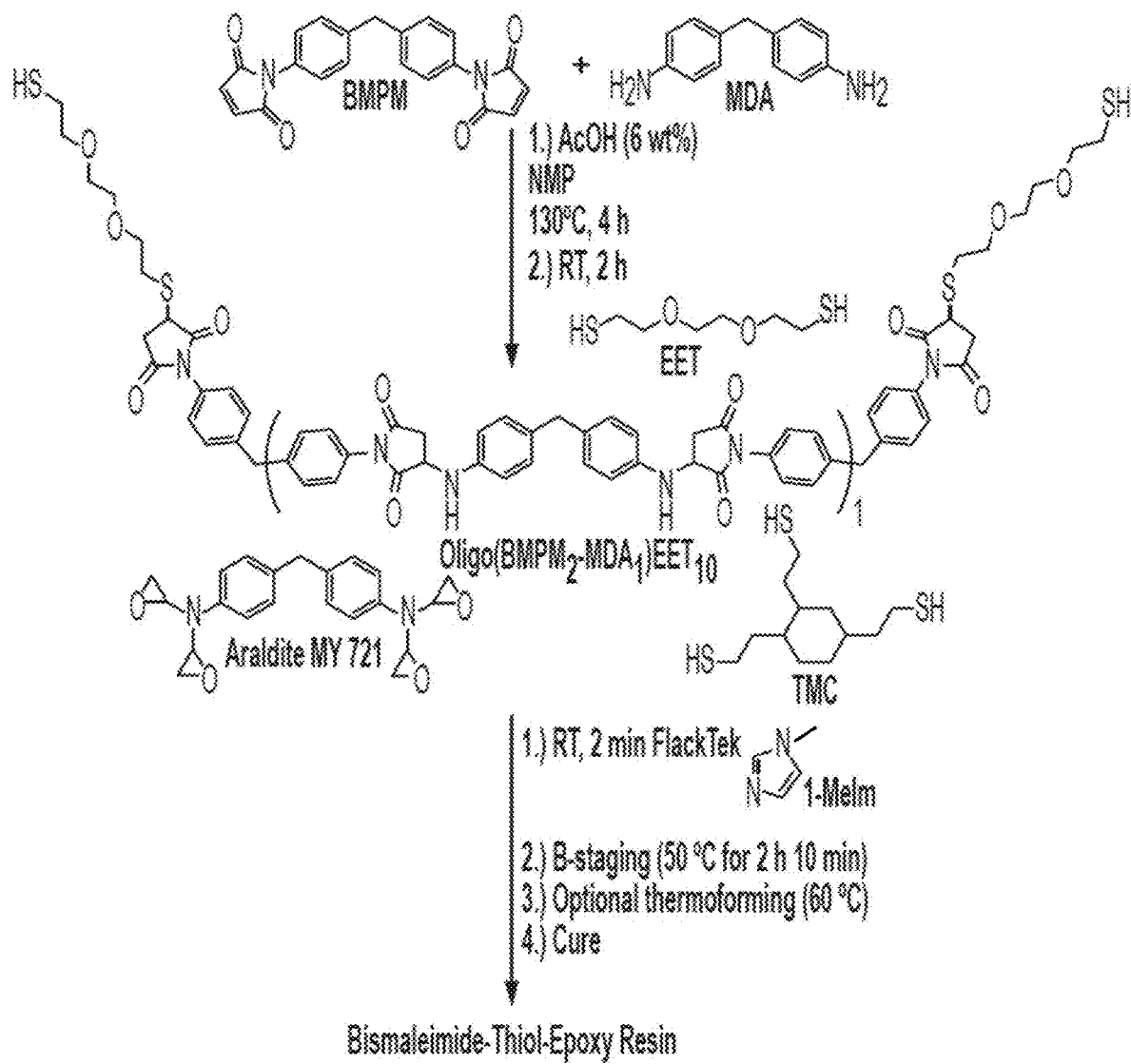
FIG. 2 depicts synthesis of oligo(BMI$_2$-MDA$_1$)EET$_{10}$ and a thiol-epoxy resin composition in Example 2A herein.

FIG. 2 depicts synthesis of oligo(BMI$_2$-MDA$_1$)EET$_{10}$ and the final thiol-epoxy resin composition. Oligo(BMI$_2$-MDA$_1$)EET$_{10}$ is prepared via a Michael addition reaction of aromatic diamines and bismaleimides followed by an in situ thiol-maleimide click coupling reaction. The final resin composition also includes a multifunctional thiol (TMC), N,N,N',N'-tetraglycidyl-4,4'-methylenebisbenzenamine epoxy (Araldite MY 721), and a curing catalyst (1-MeIm).

Example 2A-T: Thiol-Epoxy Thermoformable Rapid-Cure Resin

Thiol oligomer (Example 1A) (0.5 g, 0.18 mmol), TMC (2.90 g, 10.9 mmol), and Araldite MY721 (3.70 g, 8.2 mmol) are combined in a FlackTek cup and speedmixed at 2000 rpm for 1 min. Once combined, 1-MeIm (2 mol %) is added and speedmixed at 2000 rpm for 1 min. The resin mixture is B-staged at room temperature for 15 h.

Example 2B: Thiol-Epoxy Resin without Multifunctional Thiol Crosslinker

Thiol oligomer (Example 1B) and Araldite MY721 (8.44 g, 18.8 mmol) are combined in a FlackTek cup and speedmixed at 2000 rpm for 1 min. Once combined, 1-MeIm (2 mol %) is added and speedmixed at 2000 rpm for 1 min.

Example 2C: Thiol-Epoxy Resin without Multifunctional Thiol Crosslinker and without MDA in the Oligomer Backbone Thiol oligomer (Example 1C) (5.0 g, 3.9 mmol) and Araldite MY721 (2.58 g, 5.7 mmol) are combined in a FlackTek cup and speedmixed at 2000 rpm for 1 min. Once combined, 1-MeIm (2 mol %) is added and speedmixed at 2000 rpm for 1 min.

Example 2E: Thiol-Epoxy Resin Synthesis of PTMP-DVB-MY721

Thiol oligomer (Example 1E) (5.00 g, 2.4 mmol) and Araldite MY721 (2.54 g, 5.6 mmol) are added to a glass vial and stirred at room temperature. Once the mixture is homogeneous, 1-MeIm (0.025 mL, 1 phr) is added and allowed to stir for an additional 2 min. The resulting reaction mixture is placed in an oven at 60° C. for 2 h and then cast on a glass plate with Mylar backing. The B-staged resin is brought to room temperature before placing in the freezer at −18° C. for four weeks.

Example 3: One-Shot Resin Synthesis

In a FlackTek cup, BMI (1.79 g, 5.0 mmol), MDA (0.49 g, 2.5 mmol), EET (4.6 g, 25.00 mmol), and TMC (39.7 g, 0.15 mol) are combined and speedmixed at 2000 rpm in 2 min. Resin is mixed in subsequent 2-minute intervals. Once a homogeneous resin is obtained, 1-MeIm (2 mol %) is added and speedmixed at 2000 rpm for 1 min.

Example 4: Resin Cure for Examples 2a, 2C, and 3

The resins provided in Examples 2A, 2C, and 3 are each cured using the following temperature profile: +10° C./min to 100° C.; +3° C./min to 175° C.; and hold at 175° C. for 1 hour.

Comparative Example: Commercial API-60 Resin Cured Per Manufacturer's Technical Data Sheet API-60® part A epoxy resin is purchased from Kaneka Aerospace, LLC. The epoxy resin is cured according to the manufacturer's Technical Data Sheet using the following temperature profile: +1.2° C./min to 121° C.; hold for 4 h at 121° C.; +1.2° C. to 177° C.; and hold at 177° C. for 3 h. This Comparative Example serves as a control.

Properties and Characterization of Example Materials

Table 1 below summarizes some final properties of thiol-epoxy thermosets (Examples 2A to 2E) compared to a commercial control, API-60 (Comparative Example). Table 1 highlights the advantageous cure cycle of the disclosed thiol-epoxy resins which enable complete curing in under 2 h compared to typical epoxy-amine systems which require extensive cure times (>9 h). In Table 1, $T_g$ is glass-transition temperature, determined by dynamic mechanical analysis (DMA), and $T_{d,5\%}$ is the temperature at which 5% of weight loss is observed in TGA traces recorded from room temperature to 1000° C. In Table 1, "n.d." means not determined.

TABLE 1

Properties of Example 2A, 2B, 2C, and 2E thiol-epoxy thermosets compared to a commercial control (Comparative Example).

| Example | $T_g$ | $T_{d,5\%}$ | Cure Time |
|---|---|---|---|
| 2A | 174° C. | 317° C. | <2 h |
| 2B | 136° C. | 289° C. | <2 h |
| 2C | 75° C. | 286° C. | <2 h |
| 2E | 78° C. | 313° C. | <2 h |
| Comparative | 269° C. | 374° C. | >9 h |

Figure 3:
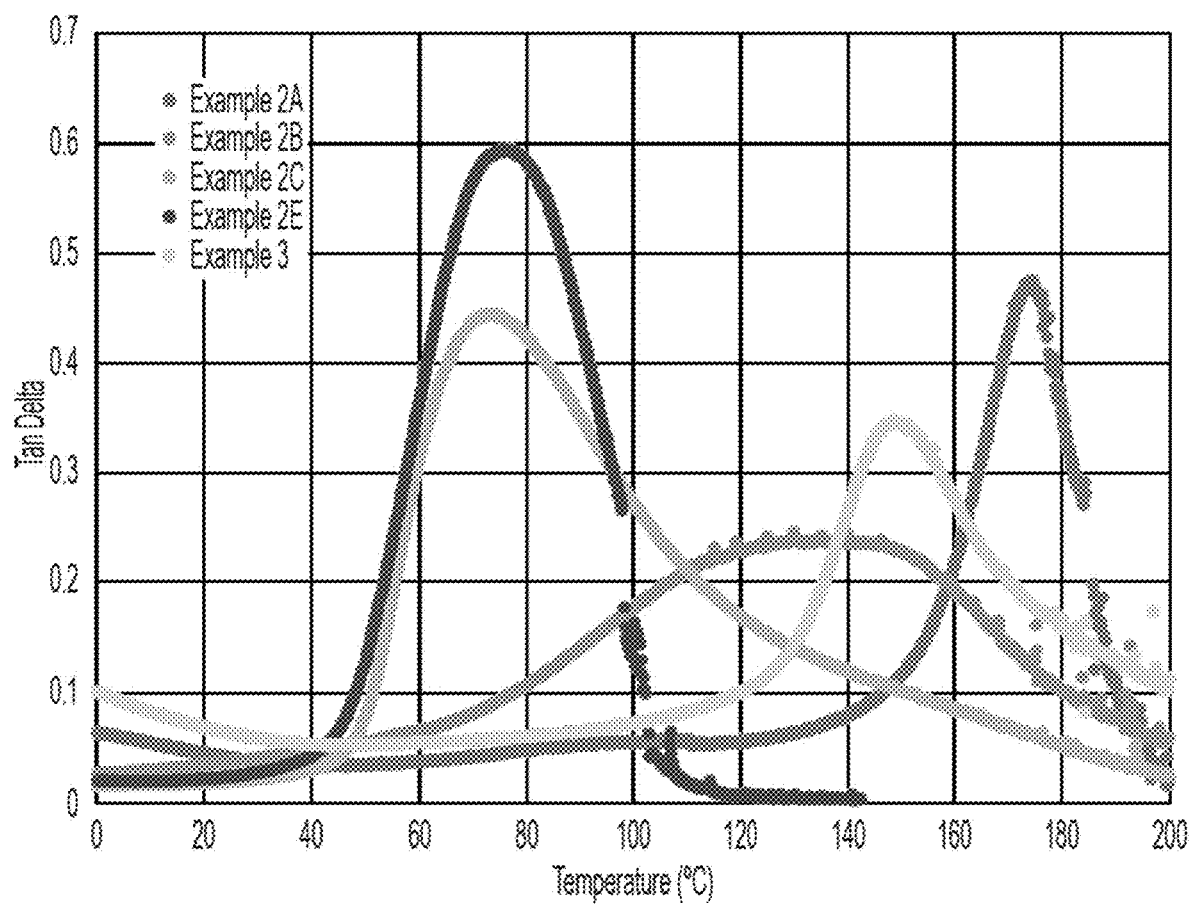
FIG. 3 depicts dynamic mechanical analysis tan delta curves illustrating the glass-transition temperatures ($T_g$) of various thiol-epoxy resins in Examples 2A, 2B, 2C, 2E, and 3 herein.

FIG. 3 depicts dynamic mechanical analysis (DMA) tan delta curves illustrating the glass-transition temperatures ($T_g$) of various thiol-epoxy resins (Examples 2A, 2B, 2C, 2E, and 3).

Figure 4:
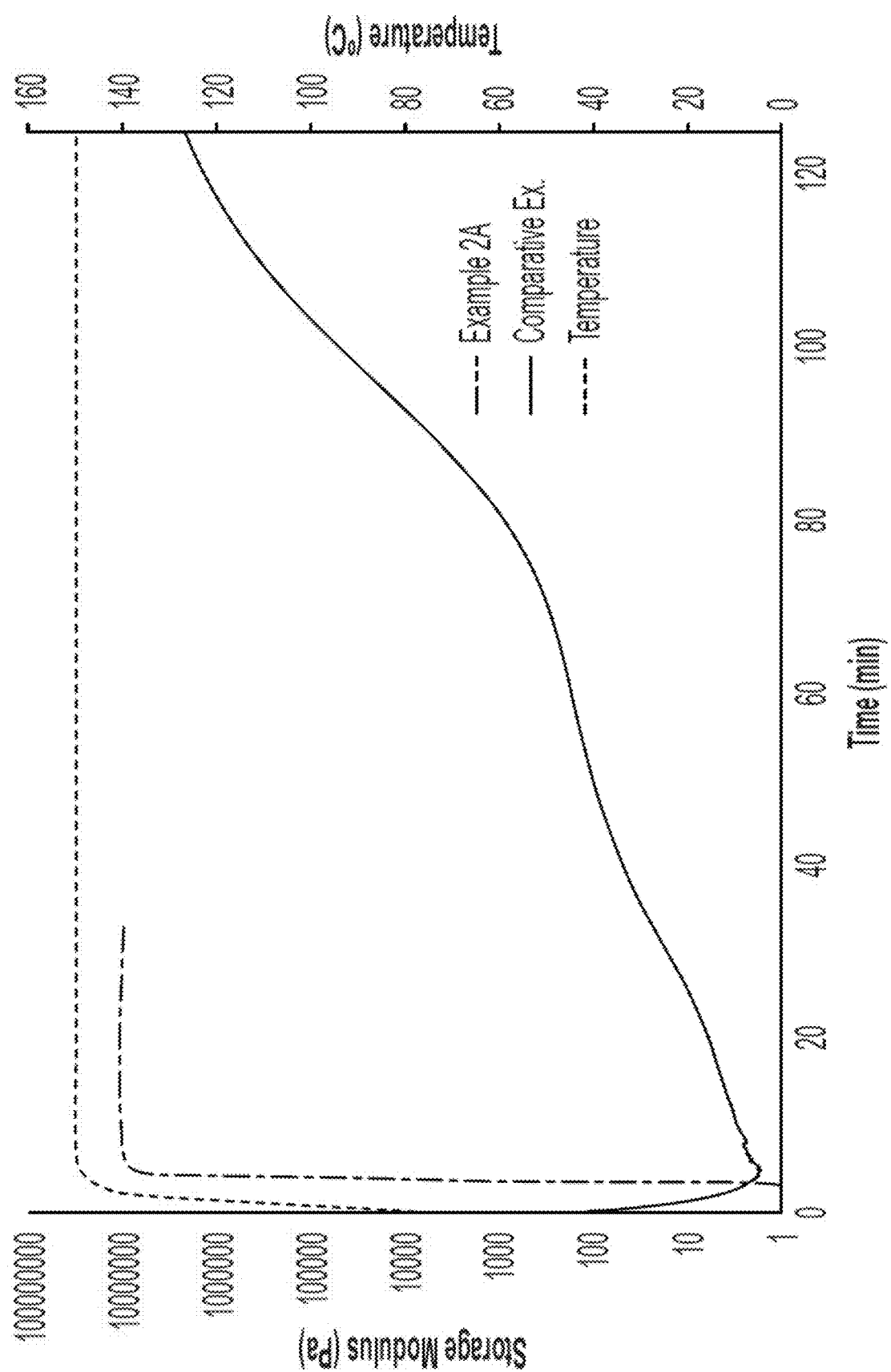
FIG. 4 shows rheology curves of storage modulus and temperature as a function of time for the Example 2A BMI-thiol-epoxy structural resin and the API-60 resin of the Comparative Example.

FIG. 4 shows rheology curves of storage modulus and temperature as a function of time. Both Example 2A (BMI-thiol-epoxy structural resin) and the API-60 resin of the Comparative Example are ramped from 80-150° C. At 80° C., the Example 2A resin begins to cure, reaching full cure after 4 min compared to API-60 which shows gradual cure progression after reaching 150° C. The API-60 resin cure is still not complete after 2 h.

Figure 5:
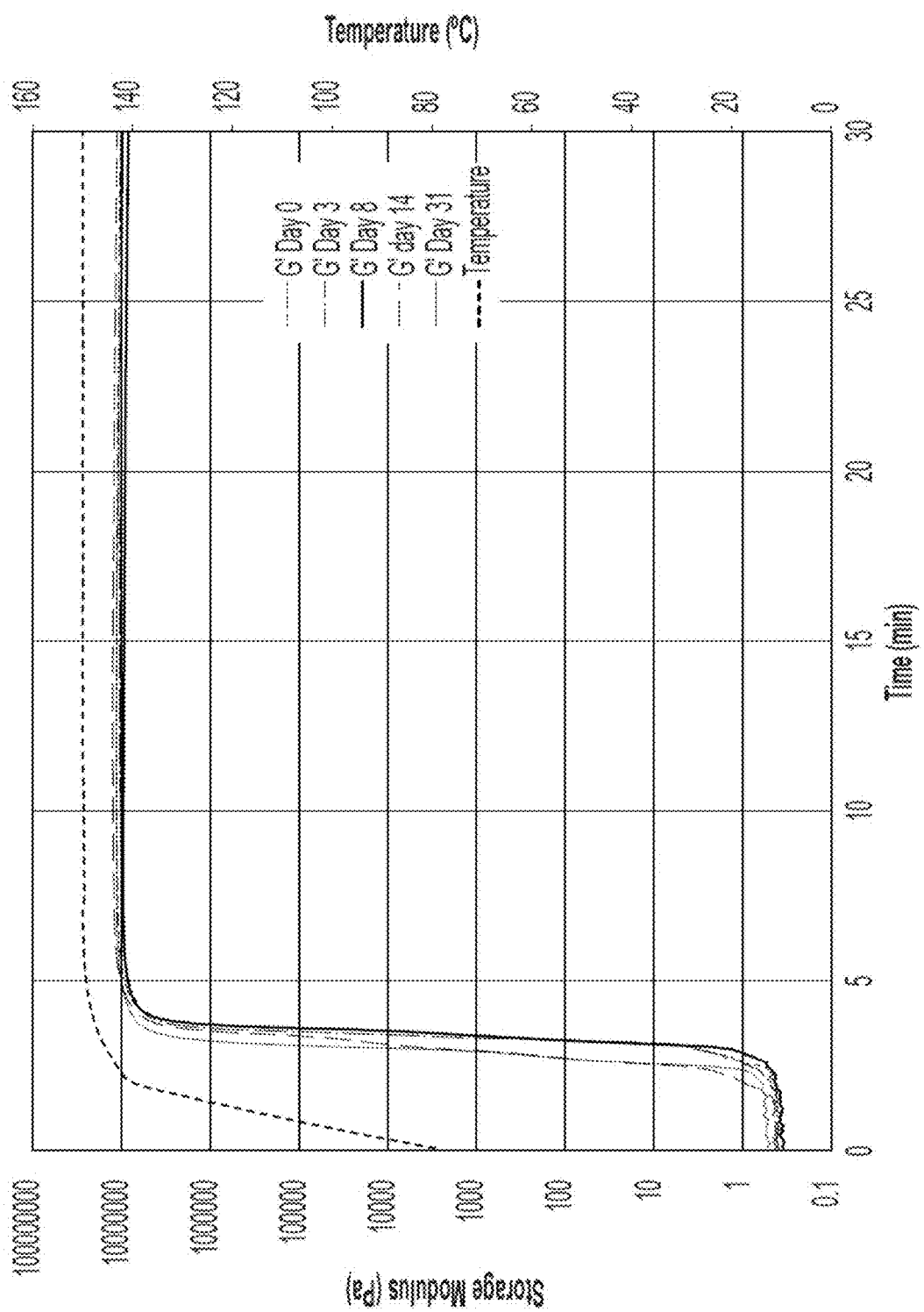
FIG. 5 shows rheology curves for the Example 2A resin at various storage times.

The stability of the Example 2A resin is evaluated using 1-month storage, at a constant temperature of −18° C. FIG. 5 shows rheology curves for the Example 2A resin at day 0 to day 31. Freezing at −18° C. sufficiently inhibits the epoxy reaction from proceeding. The resin maintains a similar initial modulus and stair-step cure over the 1-month storage study. To cure, thawed Example 2A resin (after 3, 8, 14, or 31 days) is placed in the rheometer and ramped from 80° C. to 150° C.; the reaction begins to cure within 2-4 min and is complete by about 6 min.

Table 2 below summarizes physical handling and thermomechanical properties of the Example 2A rapid-cure epoxy resin. The significant improvement in thermomechanical performance compared to known thiol-epoxy thermosets can be attributed, at least in part, to the multifunctional thiol (TMC) and increased rigidity of the prepolymer backbone.

TABLE 2

Properties of Example 2A resin.

| Property | Example 2A |
| --- | --- |
| Storage conditions | Freezer (−18° C.) |
| $T_g$ (DMA) | 172° C. |
| $T_g$ (DSC) | 142° C. |
| Wet $T_g$ (DMA)/% change | 155° C./9.9% |
| Pot life | 1 day at ambient |
| Thermal degradation ($T_{d,5\%}$) | 317° C. |
| Cure time | <2 h |
| Cure procedure | Temperature ramp |
| Solvent resistance - water, 7 days, 60° C. (volume change) | +0.30 vol % |
| Solvent resistance - kerosene, 7 days, 25° C. (volume change) | +0.18 vol % |

Figure 6A:
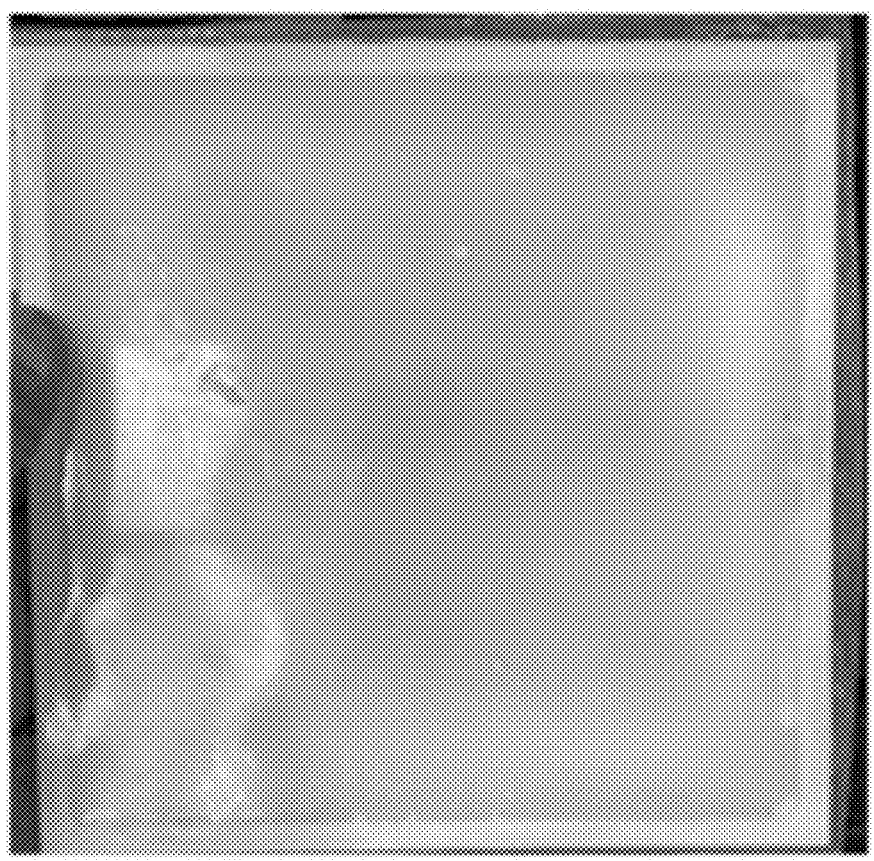
FIG. 6A is a photograph of the B-staged resin of Example 2A at 25° C.
Figure 6B:
FIG. 6B is a photograph of the Example 2A resin after 2 weeks in a freezer at −18° C.
Figure 6C:
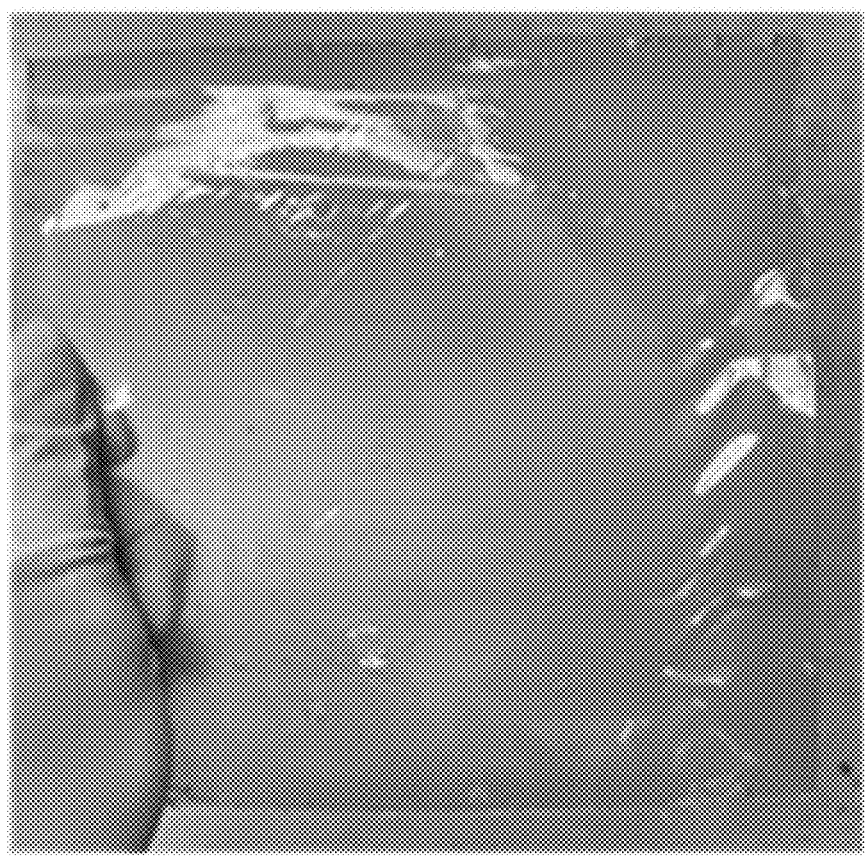
FIG. 6C is a photograph of the Example 2A resin that has been partially cured at 60° C.
Figure 6D:
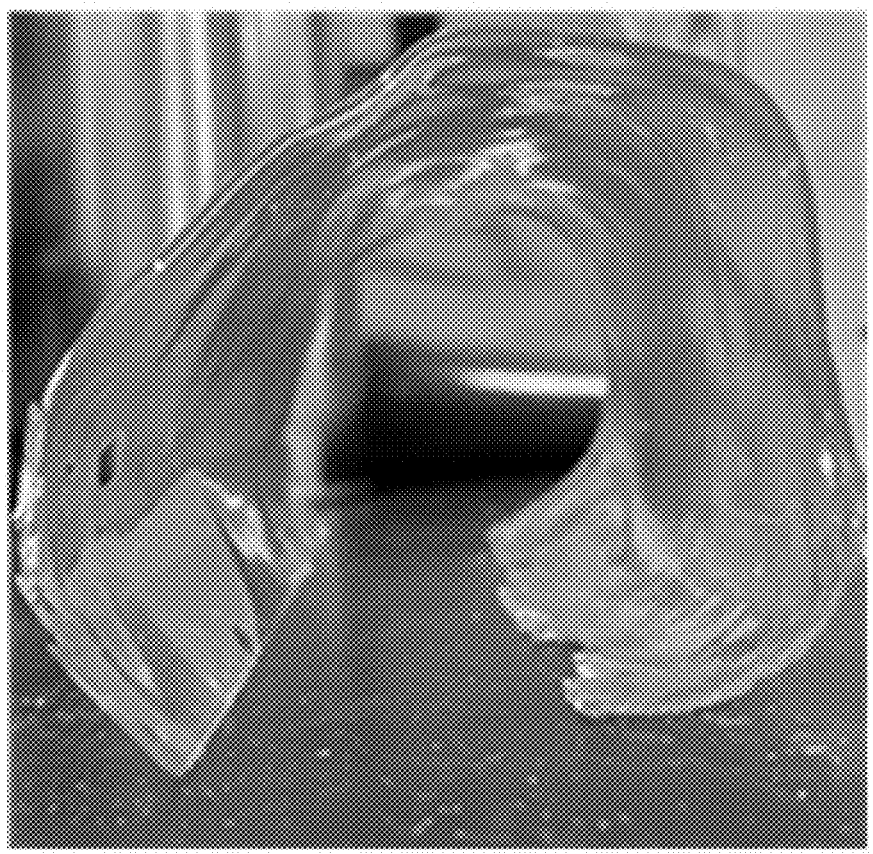
FIG. 6D is a photograph of the Example 2A resin that has been thermoformed at 60° C., after it had been partially cured.

FIG. 6A is a photograph of a B-staged resin of Example 2A at 25° C. FIG. 6B is a photograph of the Example 2A resin after 2 weeks in a freezer at −18° C. FIG. 6C is a photograph of the Example 2A resin that has been partially cured at 60° C. FIG. 6D is a photograph of the Example 2A resin that has been thermoformed at 60° C., after it had been partially cured. Controlling reaction kinetics of the Example 2A resin enables B-staging to a green state with thermoplastic character that is frozen in place and subsequently thermoformed into a thermoset once triggered.

Figure 7A:
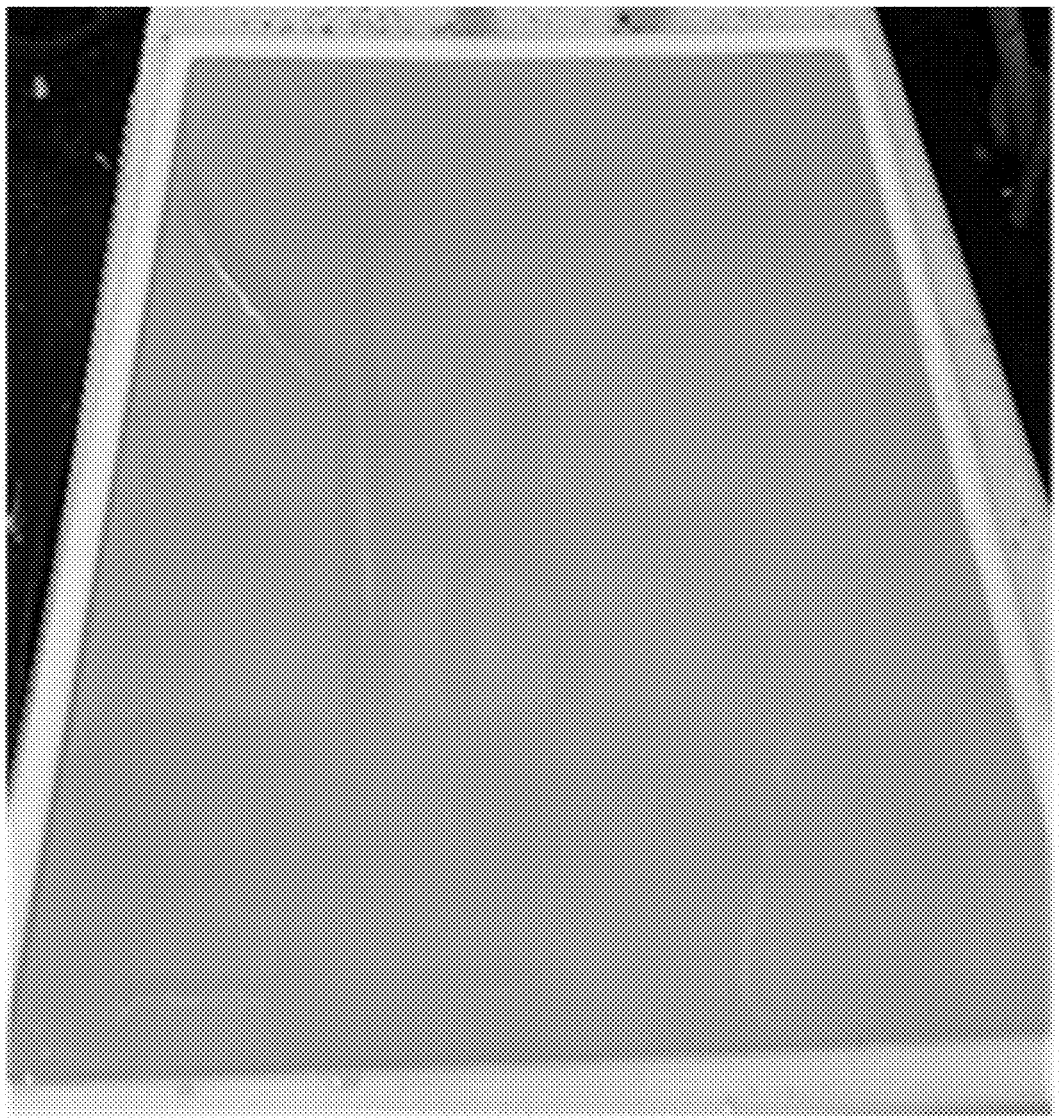
FIG. 7A shows a first stage of thermoforming of the Example 2A-T resin, in which a B-staged (at 25° C.) resin has been poured into a Teflon mold.
Figure 7B:
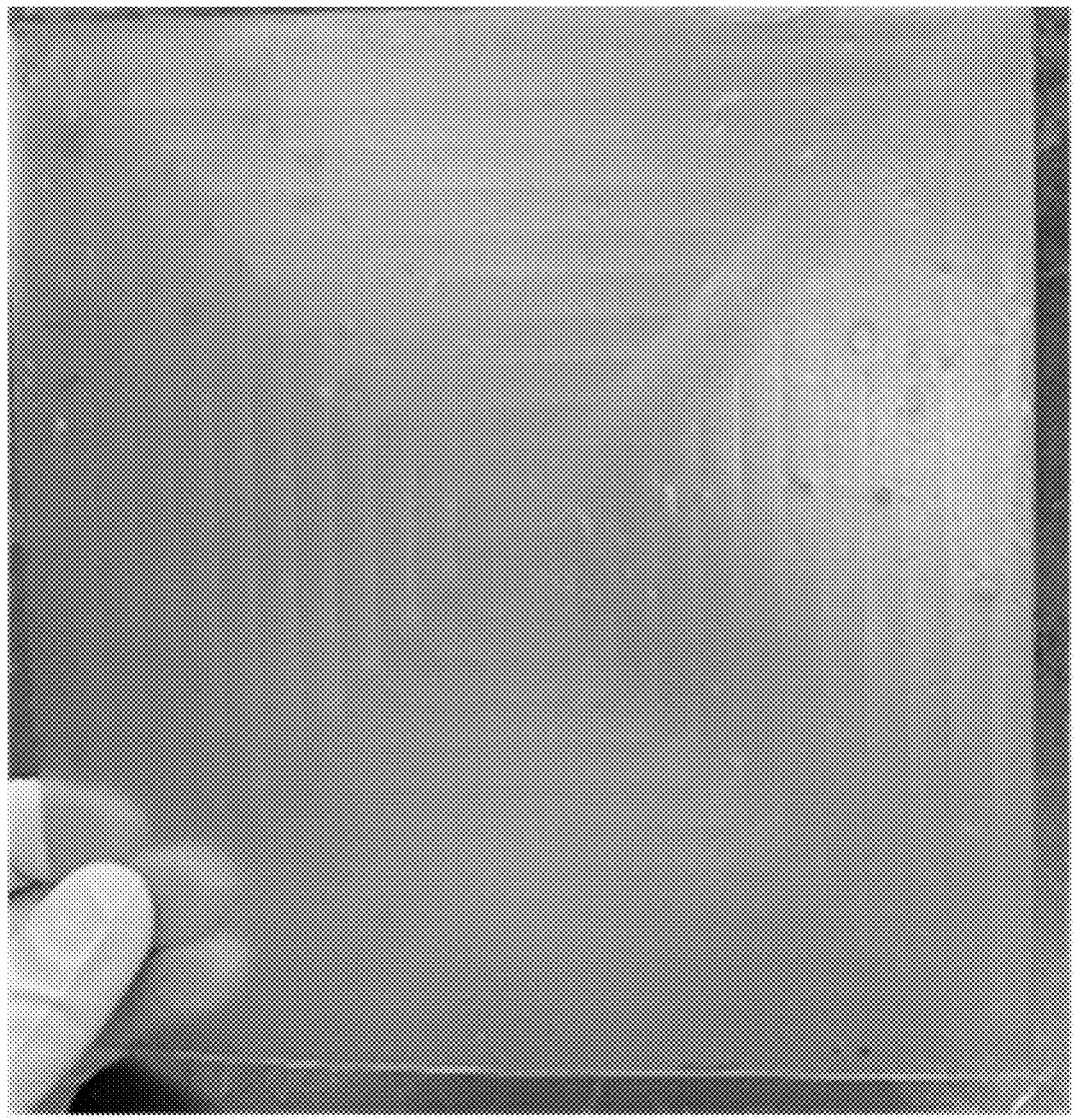
FIG. 7B shows a second stage of thermoforming of the Example 2A-T resin, in which the resin has solidified at 25° C.
Figure 7C:
FIG. 7C shows a third stage of thermoforming of the Example 2A-T resin, in which the resin has been molded into a curved panel after heating the resin in an oven at 80° C. for 10 min.
Figure 7D:
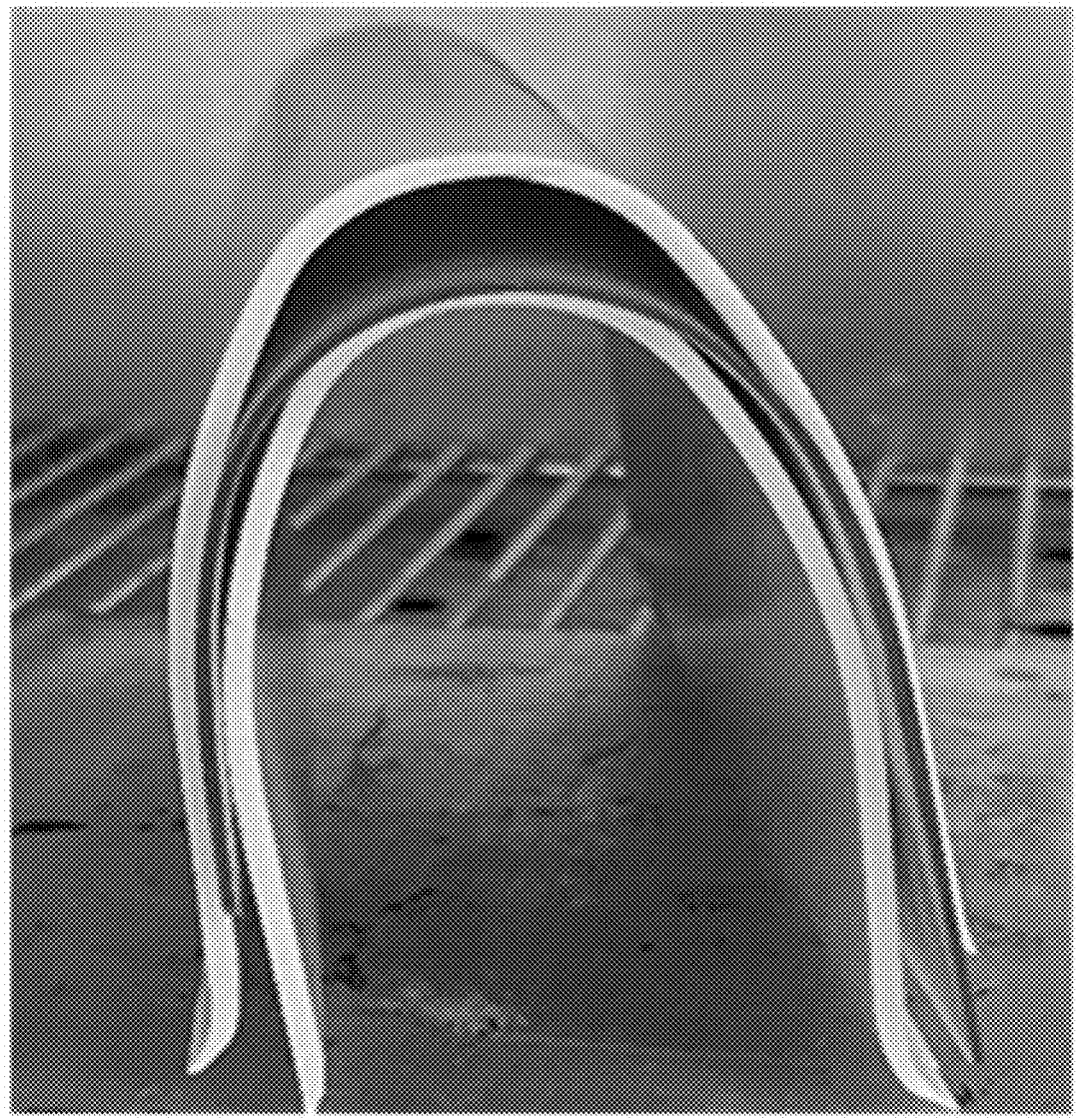
FIG. 7D shows a fourth stage of thermoforming of the Example 2A-T resin, in which the panel has cooled at 25° C. in the mold.
Figure 7E:
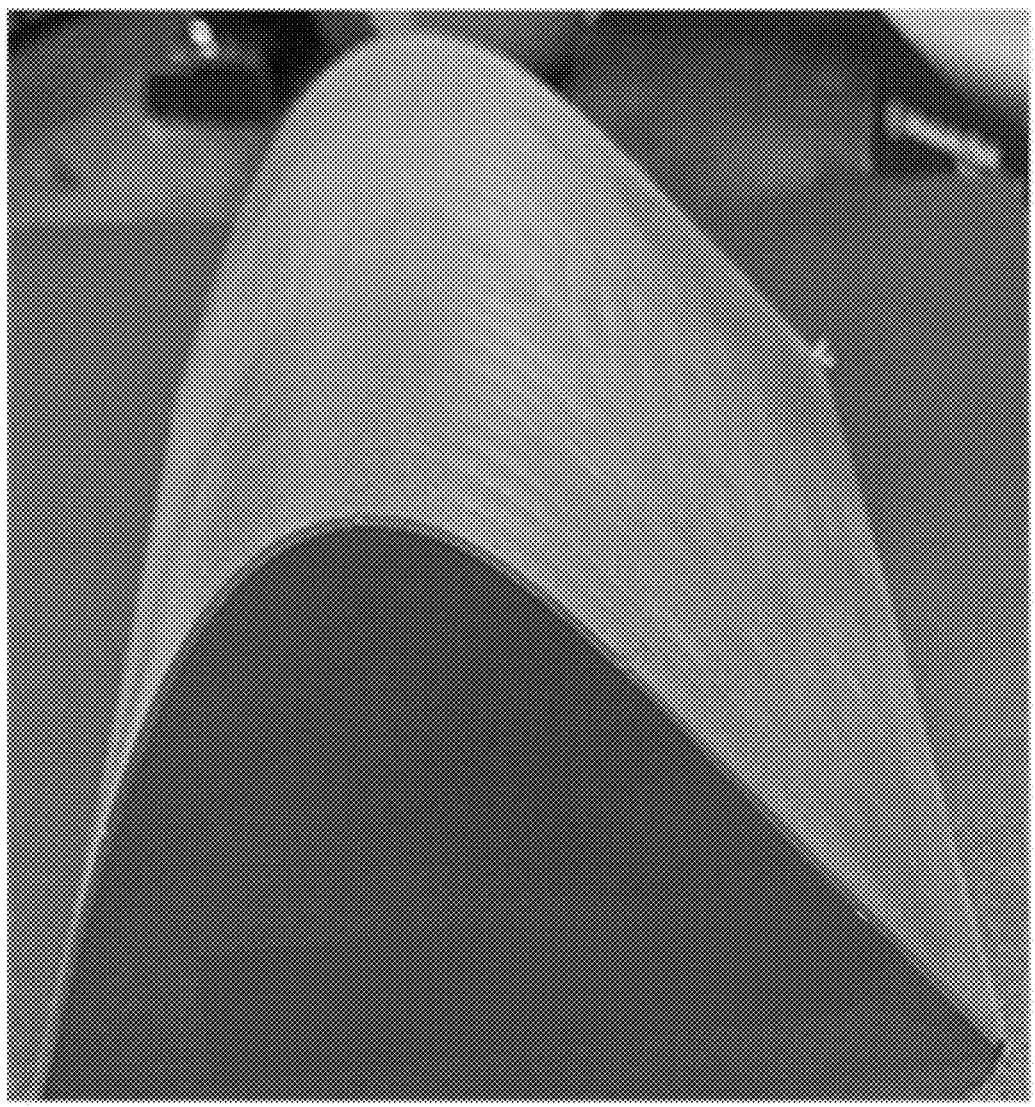
FIG. 7E shows a fifth stage of thermoforming of the Example 2A-T resin, in which the panel has been physically removed (transferred) from the mold.
Figure 7F:
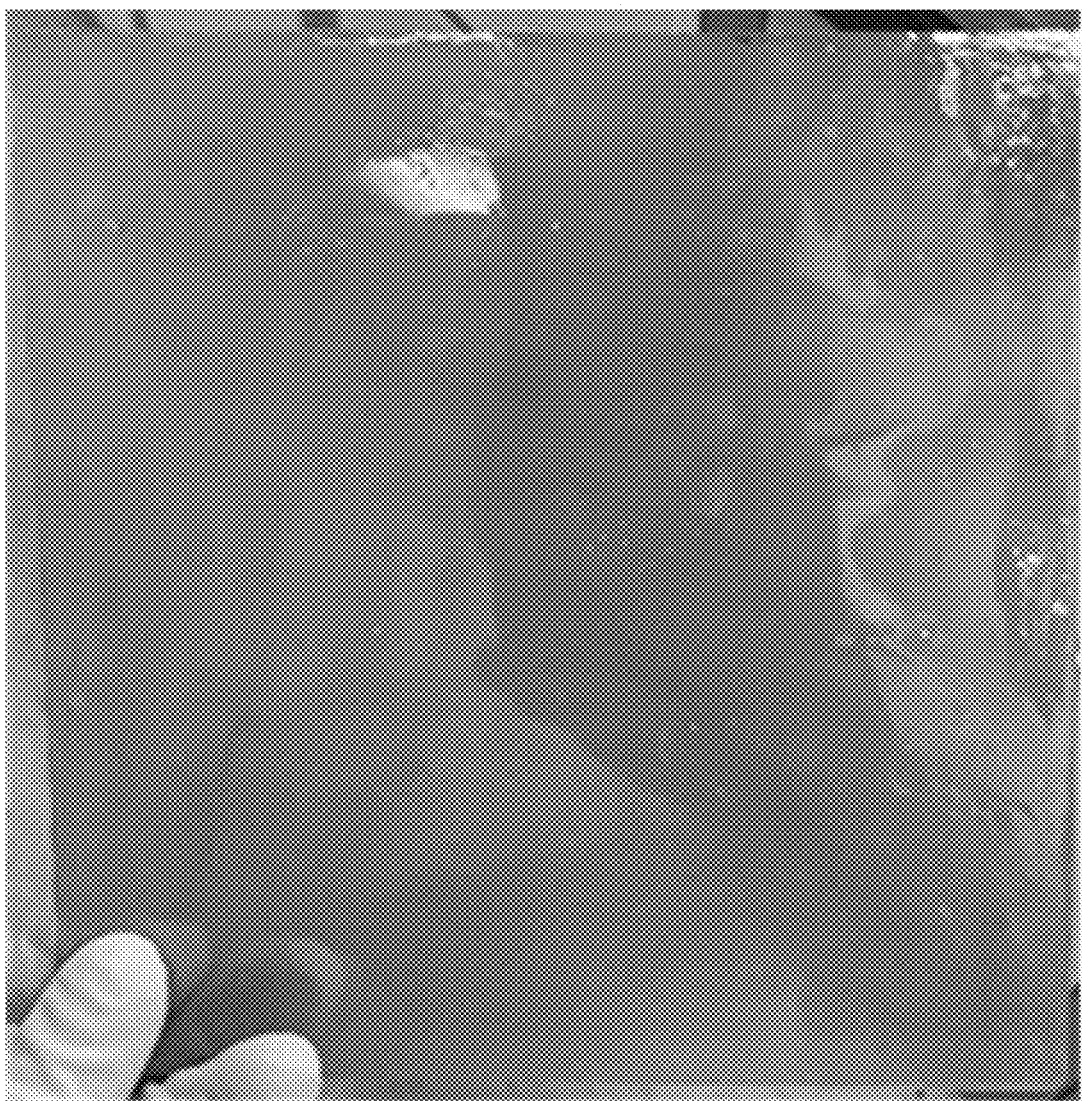
FIG. 7F shows a sixth stage of thermoforming of the Example 2A-T resin, in which the panel is again heated to 80° C., for additional thermoprocessing (and optionally exposure to pressure) or to completely cure the panel.

FIGS. 7A to 7F depict thermoforming of the Example 2A-T resin, demonstrating the ability to form, cool, and re-flatten the sheet to begin process again. In FIG. 7A, a B-staged (at 25° C.) resin has been poured into a Teflon mold. In FIG. 7B, the resin has solidified at 25° C. In FIG. 7C, the resin has been molded into a curved panel after heating the resin in an oven at 80° C. for 10 min. In FIG. 7D, the panel has cooled at 25° C. in the mold. In FIG. 7E, the panel has been physically removed (transferred) from the mold. In FIG. 7F, the panel is again heated to 80° C., for additional thermoprocessing (and optionally exposure to pressure) or to completely cure the panel.

These Examples demonstrate the synthesis, processing, and resulting properties of a low-viscosity, rapid-curing epoxy resin with thermoforming capabilities.

Applications include, but are by no means limited to, coatings, adhesives, pre-impregnated resins, structural resins, and resin-transfer molding resins.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A bismaleimide-thiol-epoxy resin composition comprising:
   (a) at least one thiol-endcapped bismaleimide monomer or oligomer, wherein said at least one thiol-endcapped bismaleimide monomer or oligomer is endcapped with a multifunctional thiol;
   (b) at least one thiol-containing species having a thiol functionality of at least 2, wherein said at least one thiol-containing species is distinct from thiol groups contained in said at least one thiol-endcapped bismaleimide monomer or oligomer, and wherein said at least one thiol-containing species is chemically different than an unreacted amount of said multifunctional thiol;
   (c) at least one epoxy species having an epoxide functionality of at least 2, wherein said at least one epoxy species is distinct from said at least one thiol-endcapped bismaleimide monomer or oligomer;
   (d) optionally, at least one curing catalyst; and
   (e) optionally, at least one additive,
   wherein said bismaleimide-thiol-epoxy resin composition is thermoformable and thermosettable.

2. The bismaleimide-thiol-epoxy resin composition of claim 1, wherein said at least one thiol-endcapped bismaleimide monomer or oligomer is an acid-catalyzed reaction product of (i) a bismaleimide, (ii) a multifunctional amine, and (iii) said multifunctional thiol.

3. The bismaleimide-thiol-epoxy resin composition of claim 1, wherein said thiol functionality is at least 3.

4. The bismaleimide-thiol-epoxy resin composition of claim 1, wherein said at least one thiol-containing species is selected from the group consisting of 1,2-bis(2-mercaptoethoxy)ethane, hexanedithiol, 1,2,4-tris(2-mercaptoethyl) cyclohexane, pentaerythritol tetrakis(3-mercaptopropionate), 4,4'-thiobisbenzenethiol, 1,4-benzenediethanethiol, and combinations thereof.

5. The bismaleimide-thiol-epoxy resin composition of claim 1, wherein said epoxide functionality is at least 3.

6. The bismaleimide-thiol-epoxy resin composition of claim 1, wherein said at least one epoxy species is selected from the group consisting of N,N,N',N'-tetraglycidyl-4,4'-methylenebisbenzenamine, bisphenol A diglycidyl ether, and combinations thereof.

7. The bismaleimide-thiol-epoxy resin composition of claim 1, wherein said at least one curing catalyst is included in said bismaleimide-thiol-epoxy resin composition.

8. The bismaleimide-thiol-epoxy resin composition of claim 7, wherein said at least one curing catalyst is selected from the group consisting of 1-methylimidazole, triethylamine, 1,8-diazabicyclo[5.4.0]undec-7-ene, 1,5-diazabicyclo[4.3.0]non-5-ene, and combinations thereof.

9. The bismaleimide-thiol-epoxy resin composition of claim 1, wherein said at least one additive is selected from the group consisting of a viscosity modifier, an adhesion promoter, a liquid toughener, a particulate toughener, an antioxidant, a thermal enhancer, a flame retardant, a surfactant, and combinations thereof.

10. The bismaleimide-thiol-epoxy resin composition of claim 9, wherein said viscosity modifier is selected from the group consisting of silica, fumed silica, polyether ether ketone, polyetherketoneketone, carbon black, alumina, glycolic acid ethoxylates, methyltrialkylammonium chloride, oleylamine, polyoxypropylene-polyoxyethylene poloxamers, polyoxyethylene isooctylcyclohexyl ether, polyethylene glycol tert-octylphenyl ether, polyethylene glycol nonylphenyl ether, 3-(1-pyridinio)-1-propanesulfonate, dimethylethylammoniumpropane sulfonate, sodium 2,3-dimercaptopropanesulfonate monohydrate, and combinations thereof.

11. The bismaleimide-thiol-epoxy resin composition of claim 9, wherein said adhesion promoter is selected from the group consisting of titanates, zirconates, silanes, and combinations thereof.

12. The bismaleimide-thiol-epoxy resin composition of claim 9, wherein said particulate toughener is selected from the group consisting of polyether ether ketone, polyetherketoneketone, acrylonitrile-butadiene-styrene terpolymers, polyaramides, polyimides, and combinations thereof.

13. The bismaleimide-thiol-epoxy resin composition of claim 9, wherein said antioxidant is selected from the group consisting of metal oxides, organic radical scavengers, inorganic radical scavengers, and combinations thereof.

14. The bismaleimide-thiol-epoxy resin composition of claim 9, wherein said thermal enhancer is selected from the group consisting of metal oxides, metal carbonates, metal nitrides, metal silicates, metal silicides, and combinations thereof.

15. The bismaleimide-thiol-epoxy resin composition of claim 9, wherein said thermal enhancer is selected from the group consisting of silica, alumina, titania, mica, $CaSiO_3$, iron oxides, and combinations thereof.

16. The bismaleimide-thiol-epoxy resin composition of claim 9, wherein said flame retardant is selected from the group consisting of ammonium salts, phosphate salts, phosphines, halogenated compounds, carbonate salts, hydroxide salts, borate salts, silica, and combinations thereof.

17. The bismaleimide-thiol-epoxy resin composition of claim 9, wherein said flame retardant is selected from the group consisting of ammonium polyphosphate, magnesium hydroxide, zinc hydroxystannate, antimony trioxide, magnesium hydroxycarbonate, zinc borate, magnesium aluminum hydroxycarbonate, aluminum trihydroxide, tetrabromobisphenol A, tetrabromobisphenol A-bis (2,3-dibromopropyl ether), bisphenol-A-bis(diphenyl phosphate), brominated polyols, melamine resins, chlorinated paraffins, and combinations thereof.

18. The bismaleimide-thiol-epoxy resin composition of claim 9, wherein said surfactant is selected from the group consisting of glycolic acid ethoxylates, methyltrialkylammonium chloride, oleylamine, polyoxypropylene-polyoxyethylene poloxamers, polyoxyethylene isooctylcyclohexyl ether, polyethylene glycol tert-octylphenyl ether, polyethylene glycol nonylphenyl ether, 3-(1-pyridinio)-1-propanesulfonate, dimethylethylammoniumpropane sulfonate, sodium 2,3-dimercaptopropanesulfonate monohydrate, and combinations thereof.

19. The bismaleimide-thiol-epoxy resin composition of claim 1, wherein said bismaleimide-thiol-epoxy resin composition is characterized by a curing time of from about 0.5 hours to about 8 hours at a curing temperature of 180° C.

20. A carbon fiber-reinforced composite comprising (i) the bismaleimide-thiol-epoxy resin composition of claim 1 and (ii) one or more continuous carbon fiber tows.

21. A method of making a bismaleimide-thiol-epoxy resin composition, said method comprising:
(i) providing a starting bismaleimide, a starting multifunctional amine, a starting multifunctional thiol, an acid catalyst, and optionally a solvent to form a starting reaction mixture;
(ii) reacting said starting bismaleimide, said starting multifunctional amine, and said starting multifunctional thiol to form at least one thiol-endcapped bismaleimide monomer or oligomer;
(iii) providing at least one thiol-containing species having a thiol functionality of at least 2, wherein said at least one thiol-containing species is distinct from thiol groups contained in said at least one thiol-endcapped bismaleimide monomer or oligomer, and wherein said at least one thiol-containing species is chemically different than an unreacted amount of said multifunctional thiol from step (ii);
(iv) providing at least one epoxy species having an epoxide functionality of at least 2;
(v) providing at least one curing catalyst;
(vi) optionally, providing at least one additive; and
(vii) combining said at least one thiol-endcapped bismaleimide monomer or oligomer, said at least one thiol-containing species, said at least one epoxy species, said at least one curing catalyst, and, if step (vi) is conducted, said at least one additive, to form a bismaleimide-thiol-epoxy resin composition.

22. The method of claim 21, wherein said starting bismaleimide is selected from the group consisting of 4,4'-bis(maleimido)diphenylmethane, N,N'-(1,3-phenylene)dimaleimide, and combinations thereof.

23. The method of claim 21, wherein said starting multifunctional amine is selected from the group consisting of 4,4'-diaminodiphenylmethane, 4,4'-diaminodiphenyl sulfone, phenyldiamine, 4,4'-(difluoromethylene)bisbenzenamine, bis(4-aminophenyl)methanone, and combinations thereof.

24. The method of claim 21, wherein said starting multifunctional thiol is selected from the group consisting of 1,2-bis(2-mercaptoethoxy)ethane, hexanedithiol, 1,2,4-tris(2-mercaptoethyl)cyclohexane, pentaerythritol tetrakis(3-mercaptopropionate), 4,4'-thiobisbenzenethiol, 1,4-benzenediethanethiol, and combinations thereof.

25. The method of claim 21, said method further comprising curing said bismaleimide-thiol-epoxy resin composition.

26. A method of thermoprocessing a bismaleimide-thiol-epoxy resin composition, said method comprising:
(i) providing a bismaleimide-thiol-epoxy resin composition comprising:

at least one thiol-endcapped bismaleimide monomer or oligomer;

at least one thiol-containing species having a thiol functionality of at least 2, wherein said at least one thiol-containing species is distinct from thiol groups contained in said at least one thiol-endcapped bismaleimide monomer or oligomer, and wherein said at least one thiol-containing species is chemically different than an unreacted amount of said multifunctional thiol;

at least one epoxy species having an epoxide functionality of at least 2;

at least one curing catalyst; and optionally, at least one additive;

(ii) thermoforming, but not completely curing, said bismaleimide-thiol-epoxy resin composition, to generate a thermoformed bismaleimide-thiol-epoxy resin; and (iii) separately from step (ii), completely curing said thermoformed bismaleimide-thiol-epoxy resin.

27. The method of claim 26, wherein said thermoforming in step (ii) is B-staging of said bismaleimide-thiol-epoxy resin composition.

28. The method of claim 27, wherein said B-staging comprises exposing said bismaleimide-thiol-epoxy resin composition to a temperature from about 25° C. to about 100° C. for a time from about 5 minutes to about 2 weeks.

29. The method of claim 27, wherein said B-staging comprises exposing said bismaleimide-thiol-epoxy resin composition to a temperature from about 10° C. to about 30° C. for a time from about 1 hour to about 24 hours.

30. The method of claim 26, wherein said thermoforming in step (ii) comprises exposing said bismaleimide-thiol-epoxy resin composition to a temperature from about 25° C. to about 100° C.

31. The method of claim 26, wherein said completely curing in step (iii) is conducted in about 8 hours or less.

32. The method of claim 26, wherein said completely curing in step (iii) is conducted at a temperature of about 200° C. or less.

* * * * *